(12) United States Patent
Minami et al.

(10) Patent No.: US 8,218,632 B2
(45) Date of Patent: Jul. 10, 2012

(54) FRAME INTERPOLATION APPARATUS AND FRAME INTERPOLATION METHOD

(75) Inventors: Koji Minami, Tokyo (JP); Toshihiro Gai, Tokyo (JP); Hironobu Yasui, Tokyo (JP); Shuji Sotoda, Tokyo (JP); Chihiro Sakuwa, Tokyo (JP); Takashi Fujiwara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1329 days.

(21) Appl. No.: 11/902,144

(22) Filed: Sep. 19, 2007

(65) Prior Publication Data

US 2008/0069217 A1    Mar. 20, 2008

(30) Foreign Application Priority Data

Sep. 20, 2006  (JP) ................. 2006-253783
Feb. 6, 2007   (JP) ................. 2007-026548

(51) Int. Cl.
*H04N 11/04*    (2006.01)
(52) U.S. Cl. .................................. 375/240.15
(58) Field of Classification Search .......... 375/240–241; 370/240–241
See application file for complete search history.

(56) References Cited

U.S. PATENT DOCUMENTS

| | | | |
|---|---|---|---|
| 2004/0046891 A1* | 3/2004 | Mishima et al. | 348/459 |
| 2004/0240551 A1* | 12/2004 | Itoh et al. | 375/240.16 |
| 2006/0092321 A1* | 5/2006 | Ogino et al. | 348/441 |
| 2006/0098740 A1* | 5/2006 | Byun et al. | 375/240.16 |
| 2008/0025403 A1* | 1/2008 | Sato et al. | 375/240.16 |

FOREIGN PATENT DOCUMENTS

| | | |
|---|---|---|
| JP | 7-15700 A | 1/1995 |
| JP | 8-9340 A | 1/1996 |
| JP | 2752007 B2 | 2/1998 |
| JP | 11-284958 A | 10/1999 |
| JP | 2004-357215 A | 12/2004 |
| JP | 3751988 B2 | 12/2005 |
| JP | 2006-129181 A | 5/2006 |
| JP | 2006-174123 A | 6/2006 |
| JP | 2006-279917 A | 10/2006 |
| WO | WO-2006/117878 A1 | 11/2006 |

* cited by examiner

*Primary Examiner* — Ricky Ngo
*Assistant Examiner* — Wei-Po Kao
(74) *Attorney, Agent, or Firm* — Birch, Stewart, Kolasch & Birch, LLP.

(57) ABSTRACT

A frame interpolation apparatus generates a pixel value at an interpolation position by examining pairs of pixel blocks, one from a preceding reference frame and one from a following reference frame, located in positions that are point-symmetric or nearly point-symmetric with respect to the interpolation position. The pair of pixel blocks showing the greatest mutual similarity is selected, the central pixels in the selected pair of pixel blocks are taken as reference pixels, and the interpolated pixel value is generated from the reference pixel values. By routinely examining a large number of pairs of pixel blocks for each interpolation position, the frame interpolation apparatus can detect image motion accurately and generate accurate interpolated values.

20 Claims, 22 Drawing Sheets

FIG.20

FRAME INTERPOLATION APPARATUS AND FRAME INTERPOLATION METHOD

BACKGROUND OF THE INVENTION

1. Field of the Invention

The present invention relates to a frame interpolation apparatus and a frame interpolation method for interpolating an image between two frames of a video signal.

2. Description of the Related Art

A disadvantage of a hold-type display device such as a liquid crystal display (LCD), in which the same image is held on display for one frame period, is that although the human eye tracks the movement of a moving object in the image continuously, the object itself moves discontinuously, one frame at a time, causing the edges of the moving object appear blurred. One possible solution to this problem is to perform frame interpolation to increase the frame rate, thereby producing a smooth visual perception of moving objects.

Film-to-video conversion of movies and the like causes another problem. Because of the different frame rates of film and video, a single image frame taken from film is sometimes displayed in two consecutive video fields and sometimes in three consecutive video fields, resulting in a type of jerky motion known as judder.

A similar problem occurs when a computer-processed moving image is converted to a video signal, because two video fields are created from the same computer-processed frame.

Conventional frame interpolation methods include zero-order hold (ZOH) interpolation, in which the image from the preceding frame is used as the interpolated image, and mean value interpolation, in which each picture element (pixel) in the interpolated image is obtained by averaging the same pixels in the preceding and following frames. Zero-order hold interpolation cannot solve the blurring problem of a hold-type display, because it does not provide a smooth visual perception of an object moving in a fixed direction. Mean value interpolation has the problem of producing double images or 'ghosts' of moving objects.

A more sophisticated interpolation method detects motion by dividing the frame preceding the interpolated frame, for example, into blocks of picture elements (pixels) finding, for each of these pixel blocks, the most highly correlated pixel block in any position in the frame following the interpolated frame, and creating a pixel block in the interpolated frame from the correlated pair of pixel blocks (see, for example, Japanese Patent Application Publication No. 2004-357215, p. 9, FIG. 16). In this method, however, although the interpolated frame is built up a pixel block at a time, the interpolated pixel blocks usually do not fit together in uniform pattern. Generating the necessary read and write addresses in the image data memory (SDRAM is used in general) and ensuing that interpolated pixels are obtained for all pixel positions becomes a complex process, making a hardware solution difficult.

Another interpolation method detects motion by comparing pairs of reference pixels in the preceding and following frames that are point-symmetric with respect to the interpolation position and takes the mean value of the most highly correlated pair of pixels (see, for example, Japanese Patent Application Publication No. 2006-129181, p. 8, FIG. 3). Because correlation is based on individual pixels, however, high correlations between pixels in dissimilar parts of the image may arise by chance, producing false motion detection and an incorrect interpolated image.

There is a need for a frame interpolation method that can eliminate blur and judder and produce an accurately interpolated image with simple read and write control.

SUMMARY OF THE INVENTION

An object of the present invention is to provide a frame interpolation apparatus that can detect image motion accurately by a straightforward computational procedure with simple read and write address control.

A frame interpolation apparatus according to the present invention generates a pixel value at an interpolation position in a frame interpolated between a first reference frame and a second reference frame. In the apparatus, a block pair extractor extracts a plurality of pixel block pairs, each including a first pixel block in the first reference frame and a second pixel block in the second reference frame. The positions of the first and second pixel blocks are substantially point-symmetric with respect to the interpolation position.

A similarity index generator calculates a similarity index for each extracted pixel block pair, indicating the degree of mutual similarity between the two pixel blocks in the pair.

A reference pixel selector selects a pair of reference pixels from central positions in the two pixel blocks constituting a pixel block pair of maximum mutual similarity, as indicated by the calculated similarity indexes.

An interpolator calculates a pixel value at the interpolation position from the values of the pair of reference pixels.

This frame interpolation apparatus is accurate because it detects image motion at each interpolation position by comparing pixel blocks that are point-symmetric, or nearly point-symmetric, with respect to the interpolation position, instead of only comparing point-symmetric pairs of pixels.

Interpolation is straightforward because the same procedure is repeated at each interpolation position. Read and write address control is simplified for the same reason. The apparatus can be easily implements in hardware and the computations are amenable to parallel processing.

BRIEF DESCRIPTION OF THE DRAWINGS

In the attached drawings:

FIG. 20 is a diagram of a matrix with elements indicating positions of different pixel block pairs, illustrating a neighborhood of a candidate block pair;

DETAILED DESCRIPTION OF THE INVENTION

Figure 1:
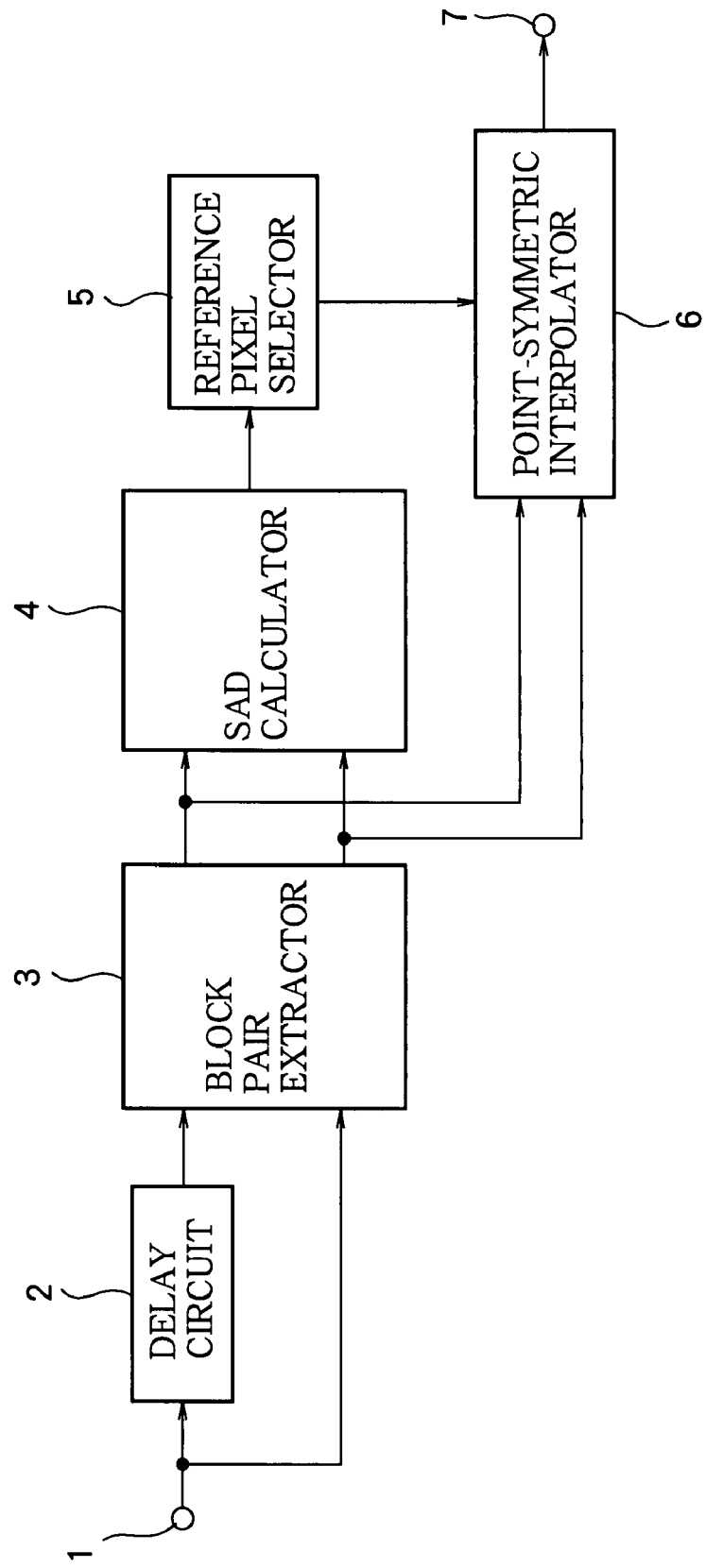
FIG. 1 is a block diagram of a frame interpolation apparatus according to a first embodiment of the invention.

Embodiments of the invention will now be described with reference to the attached drawings, in which like elements are indicated by like reference characters.

First Embodiment

Referring to FIG. 1, the frame interpolation apparatus in the first embodiment comprises an input terminal 1, a delay circuit 2, a block pair extractor 3, a sum of absolute differences (SAD) calculator 4, a reference pixel selector 5, a point-symmetric interpolator 6, and an output terminal 7.

A video signal received at the input terminal 1 is input to the delay circuit 2, in which it is delayed by one frame period. The delayed video signal is input to one input terminal of the block pair extractor 3 as a first reference frame signal. The undelayed video signal is input to another input terminal of the block pair extractor 3 as a second reference frame signal. From the first and second reference frames, the block pair extractor 3 extracts pixel blocks that are point-symmetric or approximately point-symmetric as described below.

Figure 2:
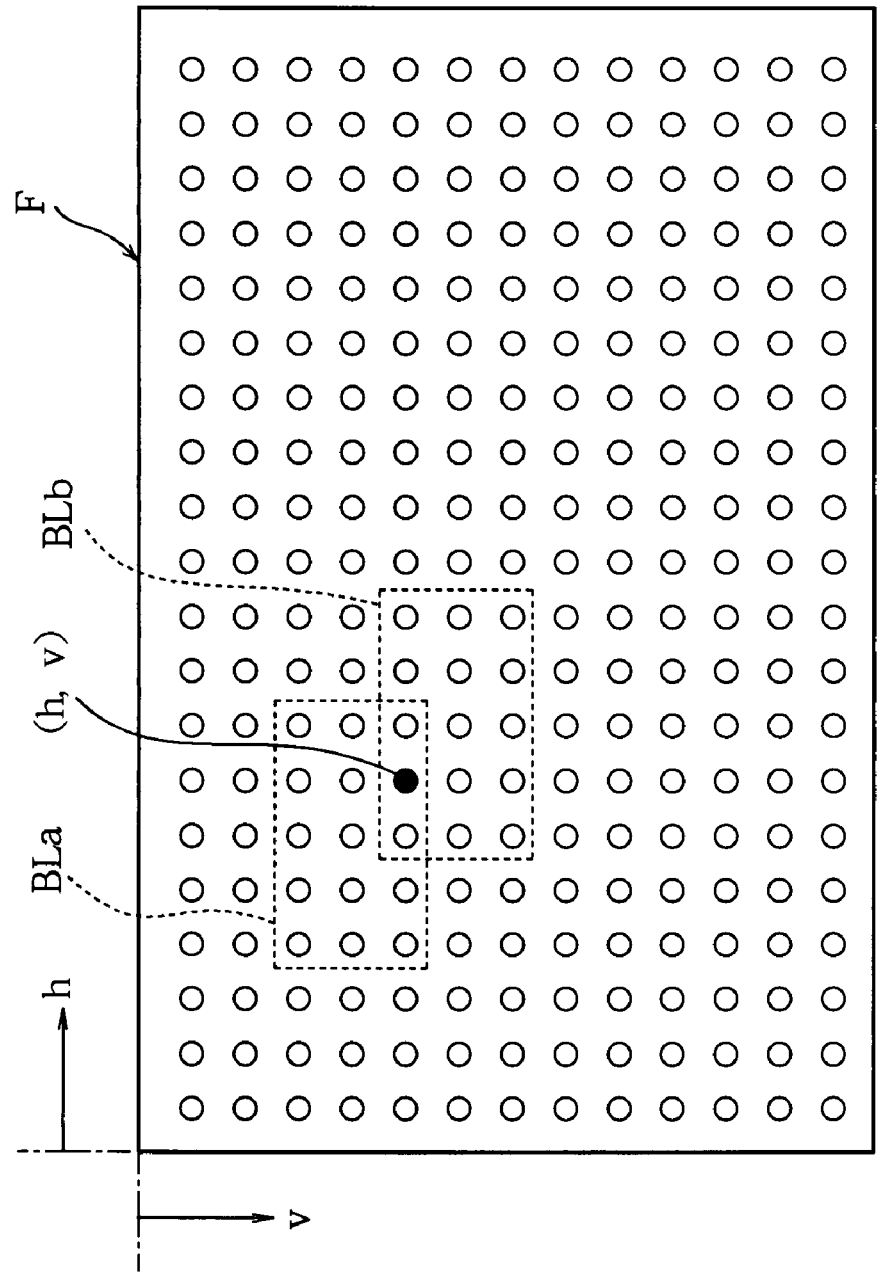
FIG. 2 illustrates a pair of pixel blocks in point-symmetric positions with reference to an interpolation position.

Referring to FIG. 2, the pixels in each frame F form a matrix on a display screen, consisting of rows aligned in the horizontal direction (the main scanning direction) and columns aligned in the vertical direction (the sub-scanning direction). The position of a pixel in the frame F can be represented by integer coordinates (h, v), where h is the horizontal coordinate value and v is the vertical coordinate value. The origin of the coordinate system is at the upper left corner of the screen; the horizontal coordinate value (h) increases by one per pixel in the left-to-right direction; the vertical coordinate value (v) increases by one per pixel in the downward direction.

The first embodiment interpolates a new frame between the first reference frame and the second reference frame. When an interpolated pixel is generated at an interpolation position (h, v) in the interpolated frame, pixel blocks BLa in the first reference frame and pixel blocks BLb in the second reference frame having center points in the horizontal range from (h−2) to (h+2) and vertical range from (v−1) to (v+1) are extracted. There are in general fifteen pixel blocks in each of the first and second reference frames that meet this condition. Each pixel block is, for example, a three-by-five pixel matrix.

FIGS. 3(a) to 3(d) and FIGS. 4(a) to 4(d) show exemplary pixel blocks; the pixel blocks in FIGS. 3(a) to 3(d) are examples of pixel blocks BLa in the first reference frame; the pixel blocks in FIGS. 4(a) to 4(d) are examples of pixel blocks BLb in the second reference frame. The black dot indicates the interpolation position in the interpolated frame.

Figure 3A:
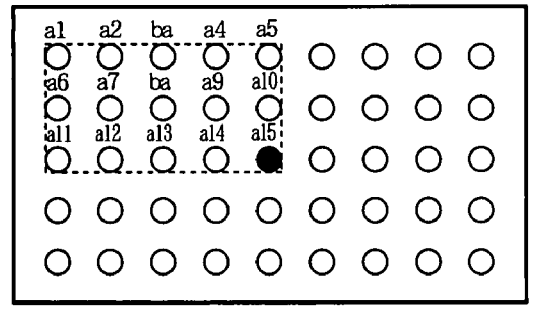
FIGS. 3(a), 3(b), 3(c), and 3(d) illustrate pixel blocks in a first reference frame.

The BLa pixel block in FIG. 3(a) and the BLb pixel block in FIG. 4(a) form a pixel block pair that is point-symmetric with respect to the interpolation position. The pixel blocks in FIGS. 3(b) and 4(b), FIGS. 3(c) and 4(c), and FIG. 3(d) and FIG. 4(d) are similarly point-symmetric. The block pair extractor 3 extracts a sequence of fifteen pixel block pairs like these that are point-symmetric with respect to the interpolation position.

Figure 5:
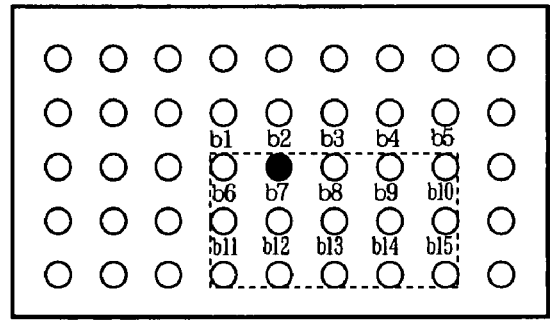
FIGS. 5(a), 5(b), 5(c), and 5(d) illustrate pixel blocks offset by one pixel from the point-symmetric position in the second reference frame.
Figure 5:
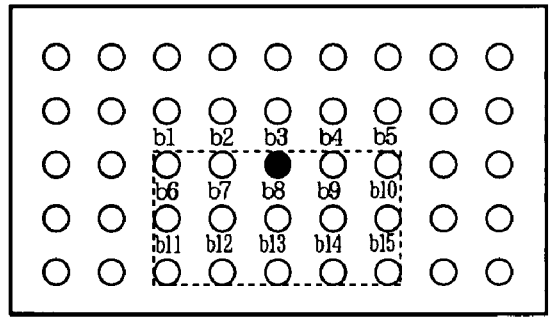
Figure 5:
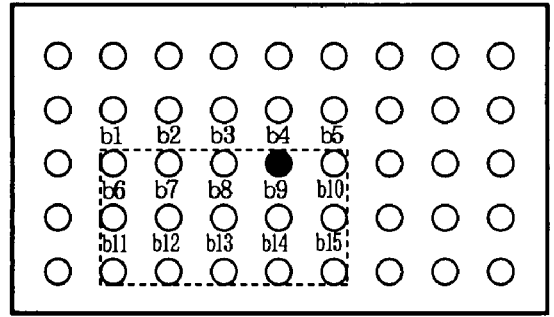
Figure 5:
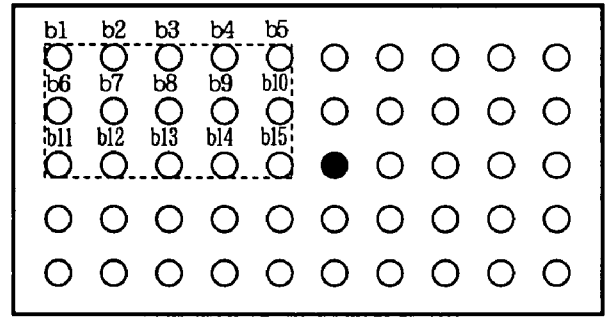

The block pair extractor 3 also extracts pixel block pairs in which one block of the pair is displaced by one pixel to the left from the point-symmetric position. For example, the block pair extractor 3 extracts a pixel block pair in which the BLa pixel block in FIG. 3(a) is paired with the BLb pixel block in FIG. 5(a), which is obtained by displaced by one pixel to the left from the point-symmetric position in FIG. 4(a). Similarly, the block pair extractor 3 extracts a pair consisting of the BLa pixel block in FIG. 3(b) and the BLb pixel block in FIG. 5(b), a pair consisting of the BLa pixel block in FIG. 3(c) and the BLb pixel block in FIG. 5(c), and a pair consisting of the BLa pixel block in FIG. 3(d) and the BLb pixel block in FIG. 5(d). The pixel blocks in FIGS. 5(b), 5(c), and 5(d) are also displaced by one pixel to the left from the point-symmetric positions in FIGS. 4(b), 4(c), and 4(d). There are fifteen pairs of pixel blocks like these.

The horizontal distance between the pixel blocks in FIGS. 3(a) to 3(d) and the corresponding pixel blocks in FIGS. 4(a) to 4(d) (the distance between corresponding pixels in the two blocks) is an even number of pixels, that is, the two point-symmetric blocks are mutually offset by a four-, two-, or zero-pixel horizontal distance. The horizontal distance between the pixel blocks in FIGS. 3(a) to 3(d) and the corresponding pixel blocks in FIGS. 5(a) to 4(d) is an odd number of pixels: the two blocks differ in horizontal position one pixel or three pixels.

The block pair extractor 3 also extracts pixel block pairs in which one block of the pair is displaced by one pixel upward from the point-symmetric position. For example, the block pair extractor 3 extracts a pixel block pair in which the BLa pixel block in FIG. 3(a) is paired with a pixel block (not shown) obtained by displacing the BLb pixel block in FIG. 4(a) upward by one pixel. There are fifteen pairs of pixel blocks like these.

The block pair extractor 3 also extracts pixel block pairs in which one block of the pair is displaced by one pixel diagonally left and upward from the point-symmetric position. For example, the block pair extractor 3 extracts a pixel block pair in which the BLa pixel block in FIG. 3(a) is paired with a pixel block (not shown) obtained by displacing the BLb pixel block in FIG. 4(a) by one pixel diagonally left and upward. There are also fifteen pairs of pixel blocks like these.

The pixel block pairs extracted by the block pair extractor 3 are input to the SAD calculator 4 and the mutual similarity of each pixel block pair is calculated. For the pair of pixel blocks in FIGS. 3(a) and 4(a), the SAD calculator 4 calculates the sum of the absolute differences between pixels $a_1$ to $a_{15}$ in the BLa pixel block in FIG. 3(a) and the corresponding pixels $b_1$ to $b_{15}$ in the BLb pixel block in FIG. 4(a) according the following equation (1).

$$SAD = \sum_{n=1}^{15} |a_n - b_n| \quad (1)$$

The sum of absolute differences SAD for each of the other pixel block pairs is similarly calculated, and the result is output to the reference pixel selector 5 as the similarity index of the pixel block pair. In all, the SAD calculator 4 calculates SAD values for sixty pairs of pixel blocks. A smaller SAD value indicates a higher similarity; a higher SAD value indicates a lower similarity.

The reference pixel selector 5 selects the minimum calculated SAD value, selects a pixel block pair having the minimum SAD value, and sends the point-symmetric interpolator 6 information indicating the positions of the pixels in the centers of the two pixel blocks in the selected pair, so that the point-symmetric interpolator 6 can use these two central pixels as reference pixels. The information the reference pixel selector 5 sends the point-symmetric interpolator 6 may specify the position of each reference pixel relative to the interpolation position. Alternatively, the information may specify the position of the second reference pixel (at the center of the BLb block) relative to the position of the first reference pixel (at the center of the BLa block); this information corresponds directly to image motion between the two reference frames.

In the present example, the central pixel is the pixel located in the central row and the central column of the block: the center of a 3-row×5-column pixel block lies in the second row and the third column. In general, in an n×m pixel block, if n and m are odd numbers, the central pixel is the pixel in the (n+1)/2-th row and (m+1)/2-th column.

If n and m are even numbers, the pixel in the n/2-th or the [(n/2)+1]-th row and the m/2-th or the [(m/2)+1]-th column is taken as the central pixel. Accordingly, the central pixel of a pixel block is not necessarily in the exact geometric center of the block, but may be adjacent to the exact center. To determine a central position unambiguously, n and m are preferably odd numbers.

The point-symmetric interpolator 6 calculates the average of the pixel values of the reference pixels selected by the reference pixel selector 5, and outputs the calculated average as the value of the interpolated pixel to the output terminal 7.

These operations are carried out for all pixel positions in the interpolated frame to obtain an interpolated image.

In the example above, the block pair extractor 3 extracts (a) pixel block pairs point-symmetric with respect to the interpolation position, and pixel block pairs in which the pixel block in one of the reference frames, e.g., the second reference frame, is displaced (b) by one pixel to the left from the point-symmetric position, (c) by one pixel upward from the point-symmetric position, and (d) by one pixel diagonally left and upward from the point-symmetric position. The present invention is not limited to this scheme, however. In order to speed up the interpolation operation or reduce the necessary amount of hardware, the block pair extractor 3 may extract, other than the point-symmetric pixel block pairs in (a) above, only pixel block pairs in which a pixel block in one of the reference frames is displaced in one of the directions (b), (c), and (d), instead of all three directions.

The pixel block in one of the reference frames may be displaced by one pixel to the right instead of the left, one pixel downward instead of upward, and one pixel diagonally right and downward, diagonally left and downward, or diagonally right and upward, instead diagonally left and upward, from the point-symmetric position.

Pixel block pairs in which a pixel block in the first reference frame instead of in the second reference frame is displaced may be used.

It is also possible to use only pixel block pairs in which one block in the pair is displaced by one pixel from the point-symmetric position, without using pixel block pairs that are point-symmetric with respect to the interpolated pixel.

One effect of the first embodiment is that because it can extract pixel block pairs in which one block in the pair is displaced by one pixel from the point-symmetric position, even if the image moves by an odd number of pixels, it is possible to select reference pixels located in the centers of a pair of pixel blocks mutually separated by a distance that most closely matches the motion, enabling more accurate interpolation.

For example, by extracting a pixel block pair in which one block in the pair is displaced one pixel to the left or right from the point-symmetric position, the first embodiment can interpolate a pixel that accurately matches horizontal motion by an odd number of pixels between the first and second reference frames.

Similarly, by extracting a pixel block pair in which one block in the pair is displaced one pixel upward or downward from the point-symmetric position, the first embodiment can interpolate a pixel that accurately matches vertical motion by an odd number of pixels between the first and second reference frames.

Similarly, by extracting a pixel block pair in which one block in the pair is displaced one pixel diagonally left and upward or diagonally right and downward, or diagonally left and downward or diagonally right and upward from the point-symmetric position, the first embodiment can interpolate a pixel that accurately matches diagonal motion by an odd number of pixels between the first and second reference frames.

By extracting pixel block pairs in which the two blocks are point-symmetric with respect to the interpolated pixel, the first embodiment can also select reference pixels located in the centers of a pair of pixel blocks mutually separated by a distance that most closely matches image motion by an even number of pixels.

Accordingly, regardless of whether an object in the image moves by an even or odd number of pixels between the first and second reference frames in any of the above-mentioned directions, the first embodiment can select reference pixels located in the centers of a pair of pixel blocks separated in a direction and by a distance most closely matching the motion, enabling accurate interpolation.

When it is determined that a pixel block pair in which one block in the pair is displaced by one pixel from the point-symmetric position has the highest similarity, not only the central pixel but also a pixel displaced by one pixel from the central pixel may be selected as the reference pixel. For example, when a pixel block pair in which one block in the pair is displaced by one pixel to the left from the point-symmetric position is determined to have the highest similarity, it is possible to select both the central pixel and the pixel adjacent to the right of the central pixel as reference pixels in each block, then average the values of these four selected reference pixels, and set the averaged value as the value of the interpolated pixel.

In a variation of the first embodiment, instead of taking the average value of the reference pixels selected by the reference pixel selector, the point-symmetric interpolator 6 uses the unaltered value of one of the reference pixels as the value of the interpolated pixel.

Figure 6:
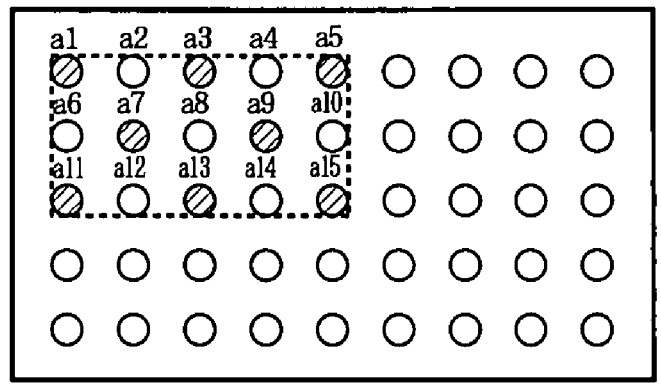
FIGS. 6 and 7 illustrate a point-symmetric pair of thinned pixel blocks.
Figure 7:
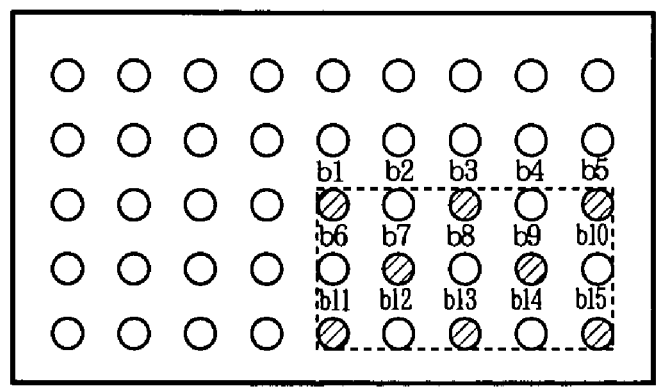

In another variation, instead of taking the sum of the absolute differences between all pairs of corresponding pixels in the two pixel blocks in each pair ($a_1$ to $a_{15}$ and $b_1$ to $b_{15}$ in equation 1), the SAD calculator 4 calculates the sum of absolute differences from the values of an evenly distributed subset of the pixels in two pixel blocks in the pixel block pair. That is, the pixels are thinned out by removing pixels at corresponding positions in the BLa and BLb pixel blocks, and the sum of the absolute differences between the remaining pixels is calculated. For example, it is possible to take every n-th pixel in the horizontal direction and every m-th pixel (where m and n are integers equal to or greater than two) in the vertical direction in the BLa pixel block, determine absolute differences between these pixel values and pixels at the corresponding positions in the BLb pixel block, and sum the results. An example of this type of thinning when m and n are both equal to two is shown in FIGS. 6 and 7. In this example, the SAD calculator 4 calculates absolute differences only between the hatched pixels, which form a checkerboard pattern including every other pixel in the horizontal and vertical directions. By reducing the necessary amount of calculation, this variation can speed up the calculation or reduce the hardware size of the SAD calculator 4.

By providing a block pair extractor 3 that extracts a plurality of substantially point-symmetric pixel block pairs from the first and second reference frames, a SAD calculator 4 that calculates the similarity of the two pixel blocks in each of the extracted pairs, a reference pixel selector 5 that selects pixels located at the centers of the pair of pixel blocks with the highest calculated similarity as reference pixels, and a point-symmetric interpolator 6 that generates an interpolated pixel from the selected reference pixels as described above, the first embodiment can detect motion accurately at each interpolation position and choose reference pixels that accurately reflect the detected motion, resulting in accurate interpolation.

In addition, since the similarity index is calculated as a sum of absolute differences between pixels in corresponding positions in predetermined pairs of pixel blocks, the similarity calculations can be performed rapidly by specialized hardware.

The most accurate interpolated image can be obtained if the sum of the absolute differences between all the pixels in one pixel block in the pair and the pixels at the corresponding positions in the other pixel block in the pair is calculated as the similarity index.

Alternately, if the sum of the absolute differences between an evenly distributed subset of pixels in the pair of pixel blocks in is used as the similarity index, the similarity index can be calculated with less hardware.

Second Embodiment

Although the first embodiment uses similarities calculated in the same way for all pairs of pixel blocks, there is a tendency for the reliability of the calculated similarity to decrease as the separation between the pixel blocks increases. The second embodiment corrects for this tendency by multiplying the calculated similarity values by coefficients that increase with increasing separation between the pixel blocks, so that pairs of mutually distant blocks are inherently considered to be less similar. The corrected similarity values are used as similarity indexes to select reference pixels.

Figure 8:
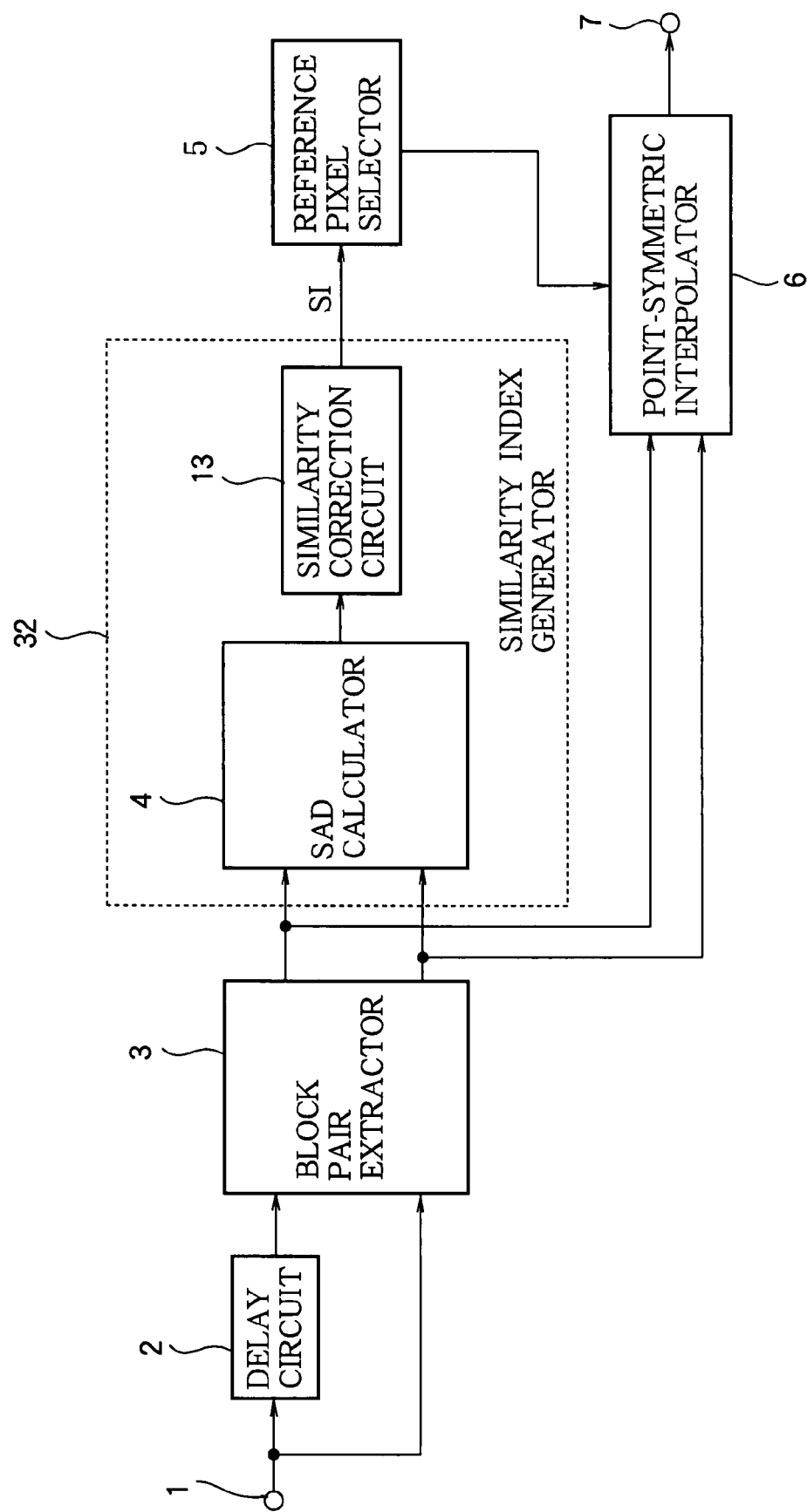
FIG. 8 is a block diagram of a frame interpolation apparatus according to a second embodiment of the invention.

Referring to FIG. 8, the structure of the frame interpolation apparatus is generally the same as in FIG. 1, but differs in that a similarity correction circuit 13 is added. The components having the same reference characters as in FIG. 1 perform the same operations as in FIG. 1.

Figure 9:
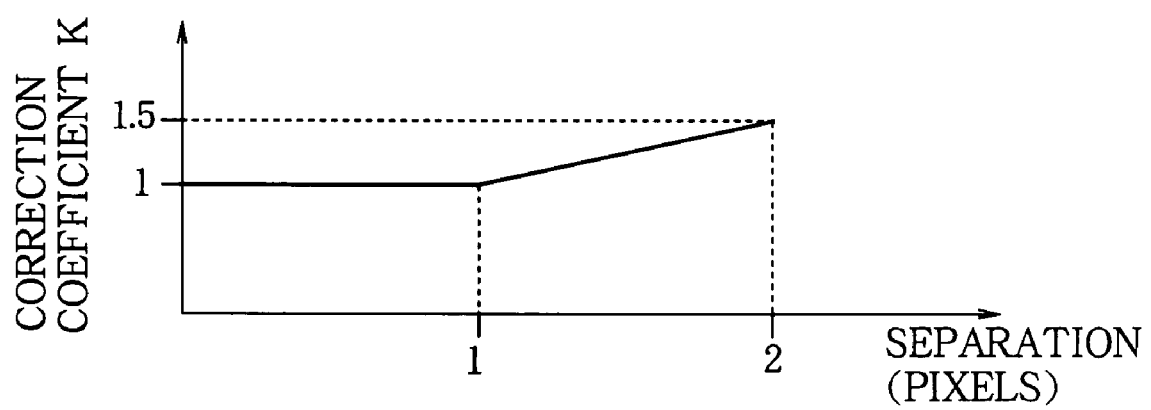
FIG. 9 is a graph illustrating values of a correction coefficient used in the second embodiment.

The similarity correction circuit 13 corrects the similarity values by multiplying the sums of the absolute differences (SAD values) calculated by the SAD calculator 4 by correction coefficients K that vary as shown in FIG. 9 according to the distances between the interpolated pixel and the central pixels in the pixel blocks, and outputs the corrected similarities to the reference pixel selector 5 as similarity indexes SI. As the SAD value increases, the similarity decreases, and likewise, as the coefficient K increases, the SI value increases, decreasing the indicated degree of similarity.

According to FIG. 9, for a separation of one pixel or less between the interpolated pixel and the central pixel of each pixel block in the pixel block pair the similarity of which is being calculated, the coefficient K is 1; for a separation of two pixels or more, K is 1.5; for separations of from one to two pixels, K increases linearly from 1 to 1.5.

The separation between the interpolated pixel and the central pixels in the pixel blocks of the pair in question is measured horizontally or vertically, whichever distance is longer. In the examples illustrated in FIGS. 3(*a*) and 3(*d*) and FIGS. 4(*a*) and 4(*d*), which show the greatest mutual separation between pixel blocks, the interpolated pixel is distant from the central pixel in each pixel block by two pixels horizontally (and by one pixel vertically), so when the similarities of these two pixel block pairs are calculated, the coefficient K is 1.5.

When the central pixels in the two pixel blocks in the pair for which the similarity is being calculated are at different distances from the interpolated pixel, the averaged distance value is used. In FIG. 3(*a*) and FIG. 5(*a*), for example, the central pixel in one pixel block in the pair is distant from the interpolated pixel by two pixels horizontally (and by one pixel vertically) and the central pixel in the other pixel block in the pair is distant from the interpolated pixel by one pixel horizontally (and by one pixel vertically), so the average distance value is 1.5 pixels, and the correction coefficient K is 1.25.

For each interpolation position, the reference pixel selector 5 receives the corrected similarity indexes of the pixel block pairs from the similarity correction circuit 13 and selects the central pixels of the pixel blocks in a pixel block pair having the highest corrected similarity (the lowest SI value, where SI=SAD×K) as reference pixels, and outputs information indicating the relative positions of the reference pixels to the point-symmetric interpolator 6. The point-symmetric interpolator 6 calculates the value of the interpolated pixel as in the first embodiment. Repetitions of this operation produce the image of the interpolated frame.

The SAD calculator 4 and similarity correction circuit 13 in FIG. 8 constitute a similarity index generator 32 for generating similarity index values SI, which the reference pixel selector 5 uses to select reference pixels. In the first embodiment shown in FIG. 1, the SAD calculator 4 itself functions as a similarity index generator.

In a variation of the second embodiment, instead of using the longer of the horizontal distance and vertical distance as the distance between the central pixels and the interpolated pixel, the similarity correction circuit 9 uses the average of the horizontal and vertical distances. In another variation, the square root of the sum of the squared horizontal and vertical distances, that is, $$\{(\text{horizontal distance})^2 + (\text{vertical distance})^2\}^{1/2}$$

is used as the distance between the central pixels in the pixel blocks and the interpolated pixel.

In still another variation, when the distances between the interpolated pixel and the central pixels in the pixel blocks of the pixel block pair under consideration differ from each other, instead of using the average value of the two distances, the similarity correction circuit 9 uses the longer or shorter distance.

As described above, the similarity indexes of pixel block pairs in which the constituent pixel blocks are widely separated are devalued. This results in more conservative motion estimation and generally produces a more accurate interpolated image.

Third Embodiment

Although the SAD calculator 4 in the first embodiment calculates similarities of pixel block pairs in the same way for both flat images (images with small pixel-to-pixel variations over a broad area of the screen) and non-flat images, there is a tendency for the calculated similarity to increase for flatter images, which can lead to inappropriate selection of reference pixels. The third embodiment corrects for this tendency by devaluating the similarities of pixel block pairs with flat image content, and uses the corrected values as similarity indexes, thereby improving the reliability of selection of the reference pixels.

Figure 10:
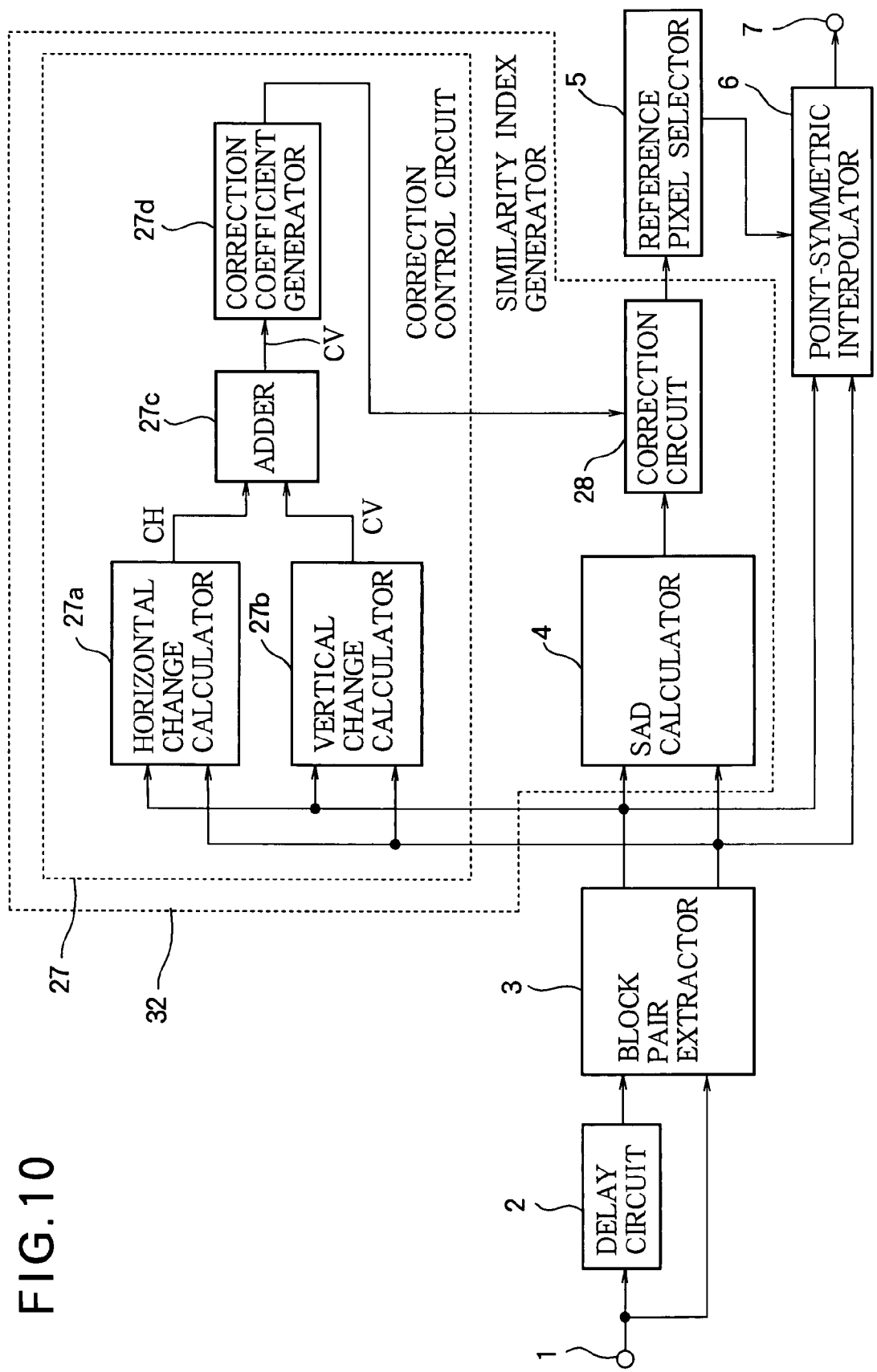
FIG. 10 is a block diagram of a frame interpolation apparatus according to a third embodiment of the invention.

Referring to FIG. 10, the structure of the frame interpolation apparatus is generally the same as in FIG. 1, but differs in that a correction control circuit 27 and a correction circuit 28 are added. The components having the same reference characters as in FIG. 1 perform operations similar to those in FIG. 1.

The similarity index generator 32 comprises the SAD calculator 4, the correction control circuit 27, and the correction circuit 28.

The correction control circuit 27 comprises a horizontal change calculator 27a, a vertical change calculator 27b, an adder 27c, and a correction coefficient generator 27d.

The horizontal change calculator 27a calculates the flatness of pixel block pairs. A method of calculating flatness will be described using the pixel block pairs in FIGS. 3(a) and 4(a) as an example. Horizontal pixel-to-pixel changes are calculated according to the following equation (2).

$$CH = \sum_{n=1}^{4} |a_n - a_{n+1}| + \sum_{n=6}^{9} |a_n - a_{n+1}| + \sum_{n=11}^{14} |a_n - a_{n+1}| + \sum_{n=1}^{4} |b_n - b_{n+1}| + \sum_{n=6}^{9} |b_n - b_{n+1}| + \sum_{n=11}^{14} |b_n - b_{n+1}| \quad (2)$$

The value calculated from this equation increases with increasing horizontal variation and decreases with decreasing horizontal variation.

The vertical change calculator 27b calculates vertical changes according to the following equation (3).

$$CV = \sum_{n=1}^{5} |a_n - a_{n+5}| + \sum_{n=6}^{10} |a_n - a_{n+5}| + \sum_{n=1}^{5} |b_n - b_{n+5}| + \sum_{n=6}^{10} |b_n - b_{n+5}| \quad (3)$$

The value calculated from this equation increases with increasing vertical variation and decreases with decreasing vertical variation.

The adder 27c adds the calculated horizontal change value CH and the calculated vertical change value CV and outputs the sum as a total change CT to the correction coefficient generator 27d.

Figure 11:
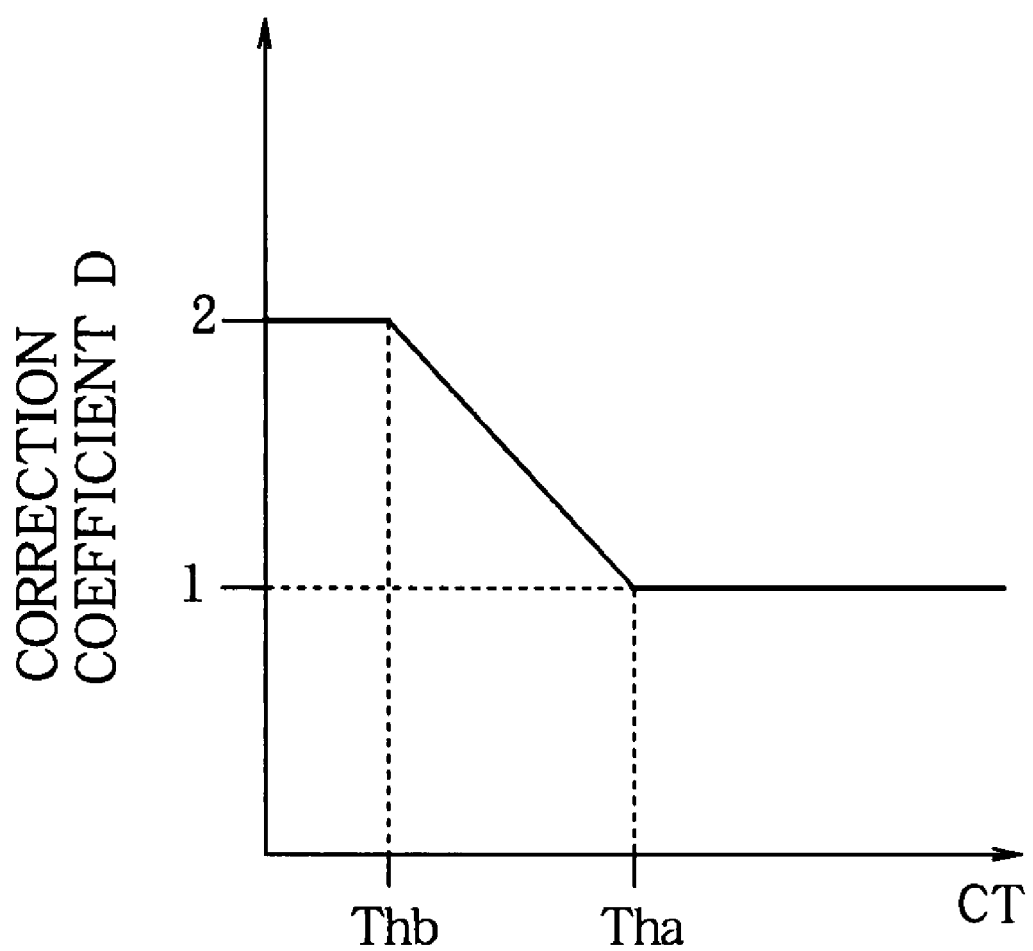
FIG. 11 is a graph illustrating values of a correction coefficient used in the third embodiment.

The correction coefficient generator 27d outputs a correction coefficient D that varies according to the total change CT. An exemplary relationship between the total change CT and the correction coefficients D is shown in FIG. 11. When CT is equal to or greater than a first predetermined value Thb, the correction coefficient D is unity (1); when CT is in the range between the first predetermined value Tha and a smaller second predetermined value Thb, the correction coefficient D gradually increases as CT decreases, reaching a value of two (2) when CT is equal to Thb. If CT is less than Thb, the correction coefficient D remains constant at two.

The correction coefficient generator 27d may be configured, for example, as a lookup table stored in a memory, or as an arithmetic and logic circuit configured to calculate the correction coefficient D.

The correction coefficient D output from the correction coefficient generator 27d is supplied to the correction circuit 28 as the output of the correction control circuit 27.

The correction circuit 28 multiplies the sum of the absolute differences SAD output from the SAD calculator 4 by the correction coefficient D, and outputs the result as the similarity index SI.

As a result of this correction, when the total change CT is equal to or greater than the first predetermined value Tha, the uncorrected sum (SAD) is used; when the total change CT is equal to or less than the second predetermined value Thb, the sum (SAD) is doubled and the similarity is halved; when the total change CT is between the first predetermined value Tha and the second predetermined value Thb, the correction coefficient D increases from one to two as the total change CT decreases, and the similarity is reduced proportionally.

Based on the output of the correction circuit 28, for each interpolation position the reference pixel selector 5 selects the central pixels of the pixel blocks in a pixel block pair having the highest corrected similarity (the lowest SI value, where SI=SAD×D), as reference pixels, and outputs information indicating the relative positions of the reference pixels to the point-symmetric interpolator 6. The point-symmetric interpolator 6 calculates the value of the interpolated pixel as in the first embodiment to obtain a pixel in the interpolated frame.

The structure described above, in which total pixel-to-pixel changes in the pixel blocks are calculated and the similarity is reduced when the calculated change is small, corrects the tendency of flat images to be interpolated incorrectly.

Fourth Embodiment

In the first to third embodiments, reference pixels are selected on the basis of similarity indexes calculated from sums of absolute differences between pairs of pixels in substantially point-symmetric blocks. Interpolation accuracy can be improved by also taking into consideration the directions in which the reference pixels were located in the interpolation of pixels preceding and following the current interpolation position.

Figure 12:
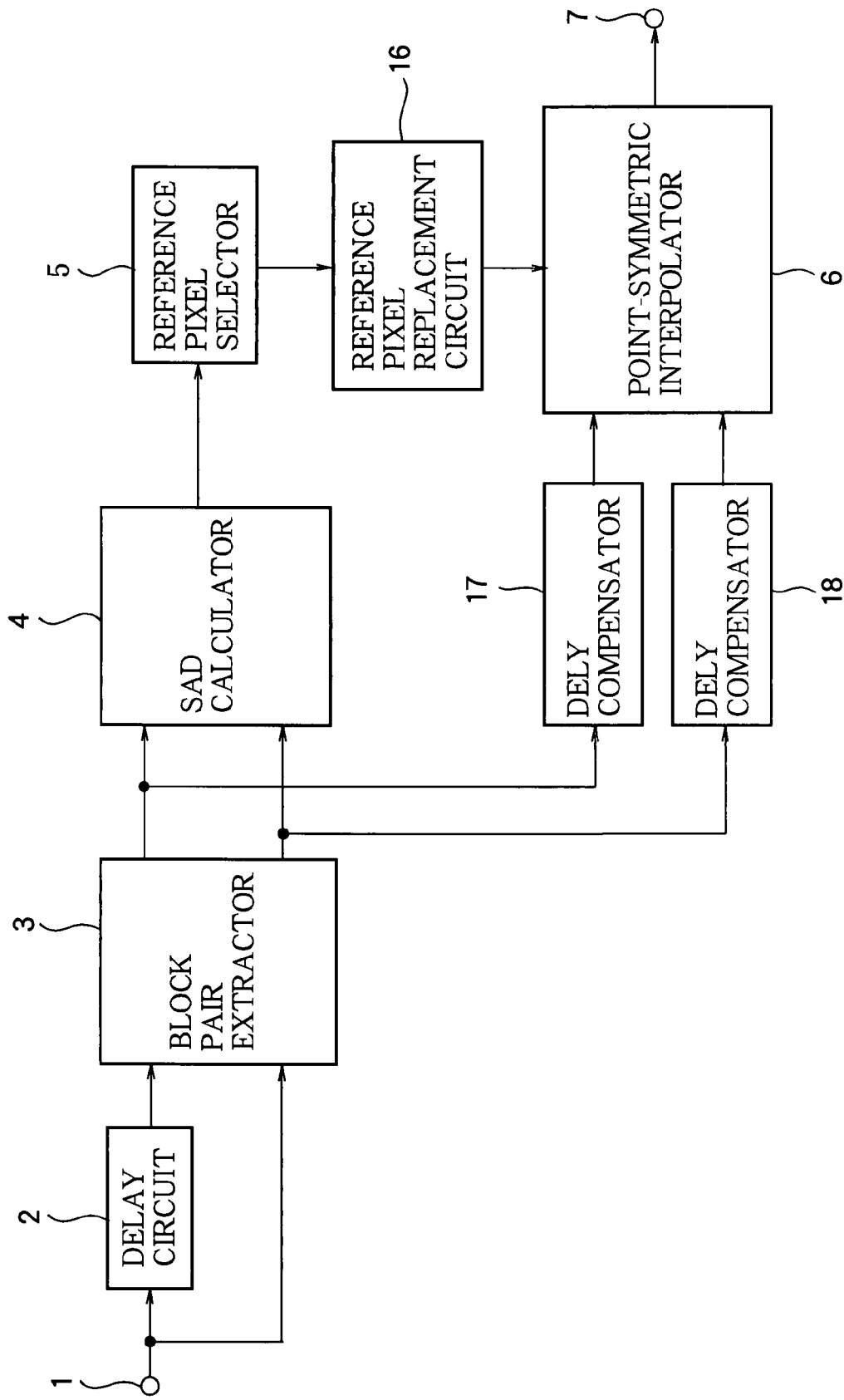
FIG. 12 is a block diagram of a frame interpolation apparatus according to a fourth embodiment of the invention.
Figure 13:
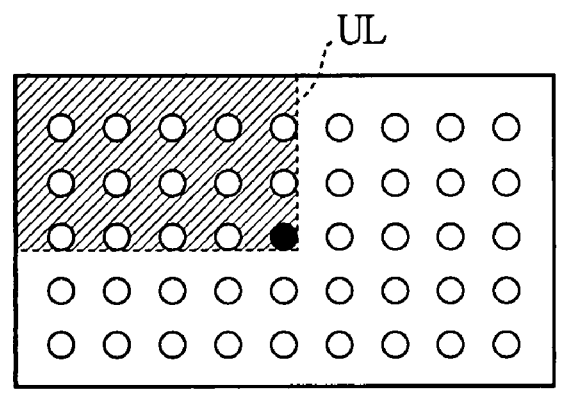
FIGS. 13(a), 13(b), 13(c), and 13(d) illustrate quadrants used for setting flags in the fourth embodiment.
Figure 13:
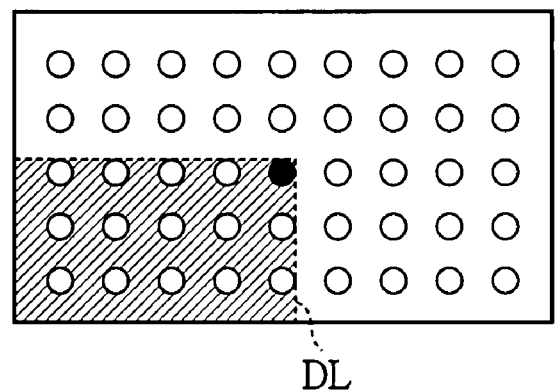
Figure 13:
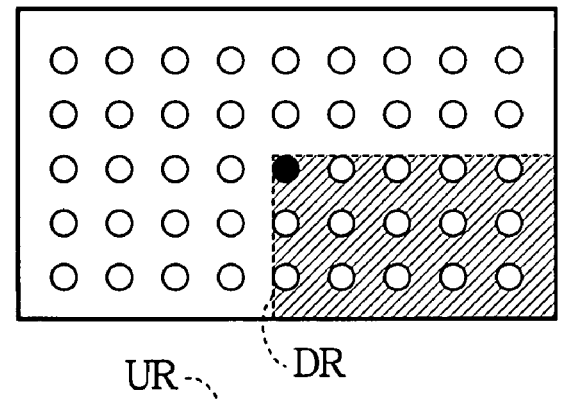
Figure 13:
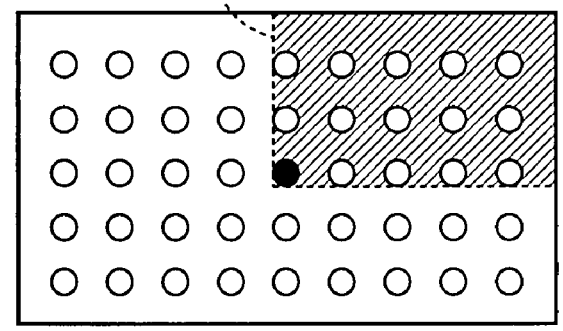

Referring to FIG. 12, the structure of the frame interpolation apparatus in the fourth embodiment is generally the same as in FIG. 1, but differs in that a reference pixel replacement circuit 16 and a pair of delay compensators 17, 18 are added. The components having the same reference characters as in FIG. 1 perform the same operations as in the first embodiment.

The reference pixel replacement circuit 16 stores the information indicating the directions of reference pixels selected by the reference pixel selector 5 for a plurality of horizontally consecutive interpolation positions at which pixels are to be interpolated, e.g., seven consecutive interpolation positions. For example, the reference pixel replacement circuit 16 may store flags that indicate the approximate directions (relative positions) of the reference pixels selected by the reference pixel selector 5. In the following description, the flags identify the quadrants in which the selected reference pixels in the first reference frame are located with respect to the interpolation position.

Examples will be described with reference to FIGS. 13(a) to 13(d). If the central pixel of the pixel block in the first reference frame of a pixel block pair selected by the reference pixel selector 5 is located in the upper left quadrant UL in FIG. 13(a), a first flag FUL is set; if the central pixel is located in the lower left quadrant DL in FIG. 13(b), a second flag FDL is set; if the central pixel is located in the lower right quadrant DR in FIG. 13(c), a third flag FDR is set; if the central pixel is located in the upper right quadrant UR in FIG. 13(d), a fourth flag FUR is set. If the central pixel is located in one of the first to fourth columns and the third line, the first flag FUL and the second flag FDL are set concurrently (indicating that the central pixel is within both left quadrants); if the central pixel is located in one of the sixth to ninth columns and the third line, the third flag FDR and the fourth flag FUR are set concurrently (indicating that the central pixel is within both right quadrants); if the central pixel is located in the fifth column and the first or second line, the first flag FUL and the fourth flag FUR are set concurrently (indicating that the central pixel is within both upper quadrants); if the central pixel is located in the fifth column and the fourth or fifth line, the second flag FDL and the third flag FDR are set concurrently (indicating that the central pixel is within both lower quadrants); if the central pixel is located in the fifth column and the third line, all four flags FUL, FDL, FDR, and FUR are set concurrently (indicating that the central pixel is within all four quadrants).

For each interpolation position, the reference pixel replacement circuit 16 instructs the point-symmetric interpolator 6 to use either the pair of reference pixels selected by the reference pixel selector 5, or the pair of pixels located at the same position as the interpolation position in the first and second reference frames. If the flags set for the interpolation position (position n) indicate one or both of the left quadrants, and if each of the three preceding interpolation positions in the same horizontal line (positions (n−3), (n−2), and (n−1)) has at least one flag set matching any of the flags set for the interpolation position (position n), the reference pixels selected by the reference pixel selector 5 are used. If the flags set for the interpolation position (position n) indicate one or both of the right quadrants, and if each of the three following interpolation positions in the same horizontal line (positions (n+1), (n+2), and (n+3)) has at least one flag set matching any of the flags set for the interpolation position (position n), the reference pixels selected by the reference pixel selector 5 are used. If neither of these conditions is satisfied, the pixels located at the same positions as the interpolated pixels in the first and second reference frames are used.

In other words, when the reference pixel selector 5 detects left-to-right motion of the image at the interpolation position the reference pixel replacement circuit 16 accepts the reference pixels selected by the reference pixel selector 5 if the motion detected at each of the three horizontally preceding positions is consistent with the motion detected at the interpolation position. Similarly, when the reference pixel selector 5 detects right-to-left motion of the image at the interpolation position, the reference pixel replacement circuit 16 accepts the reference pixels selected by the reference pixel selector 5 if the motion detected at each of the three horizontally following positions is consistent with the motion detected at the interpolation position. When the reference pixel selector 5 detects both left-to-right and right-to-left motion at the interpolation position, that is, when vertically upward or downward motion or no motion is detected, the reference pixel replacement circuit 16 accepts the reference pixels selected by the reference pixel selector 5 if the motion detected at either the three horizontally preceding positions or the three horizontally following positions is consistent with the motion detected at the interpolation position. In other cases, motion is treated as undetectable and reference pixels at the interpolation position are used instead of the reference pixels selected by the reference pixel selector 5.

The delay compensators 17, 18 compensate for the delay caused by the processing performed by the reference pixel replacement circuit 16. The point-symmetric interpolator 6 generates interpolated pixels by using the values of reference pixels selected from the output of the delay compensators 17, 18 according to the reference pixel position information furnished by the reference pixel replacement circuit 16.

The fifth embodiment improves the interpolated image by avoiding the use of inconsistently divergent interpolation directions. That is, a pixel in the interpolated frame will not be regarded as a site of left-to-right motion if right-to-left motion was detected at a closely preceding pixel site, and will not be regarded as a site of right-to-left motion if left-to-right motion was detected at a closely following pixel site.

Fifth Embodiment

In the first four embodiments, the same frame interpolation process is used for both moving and still pictures, but more correctly interpolated images can be obtained if a different interpolation process is used for still pictures. This is done in the fifth embodiment, which will be described with reference to FIG. 14.

Figure 14:
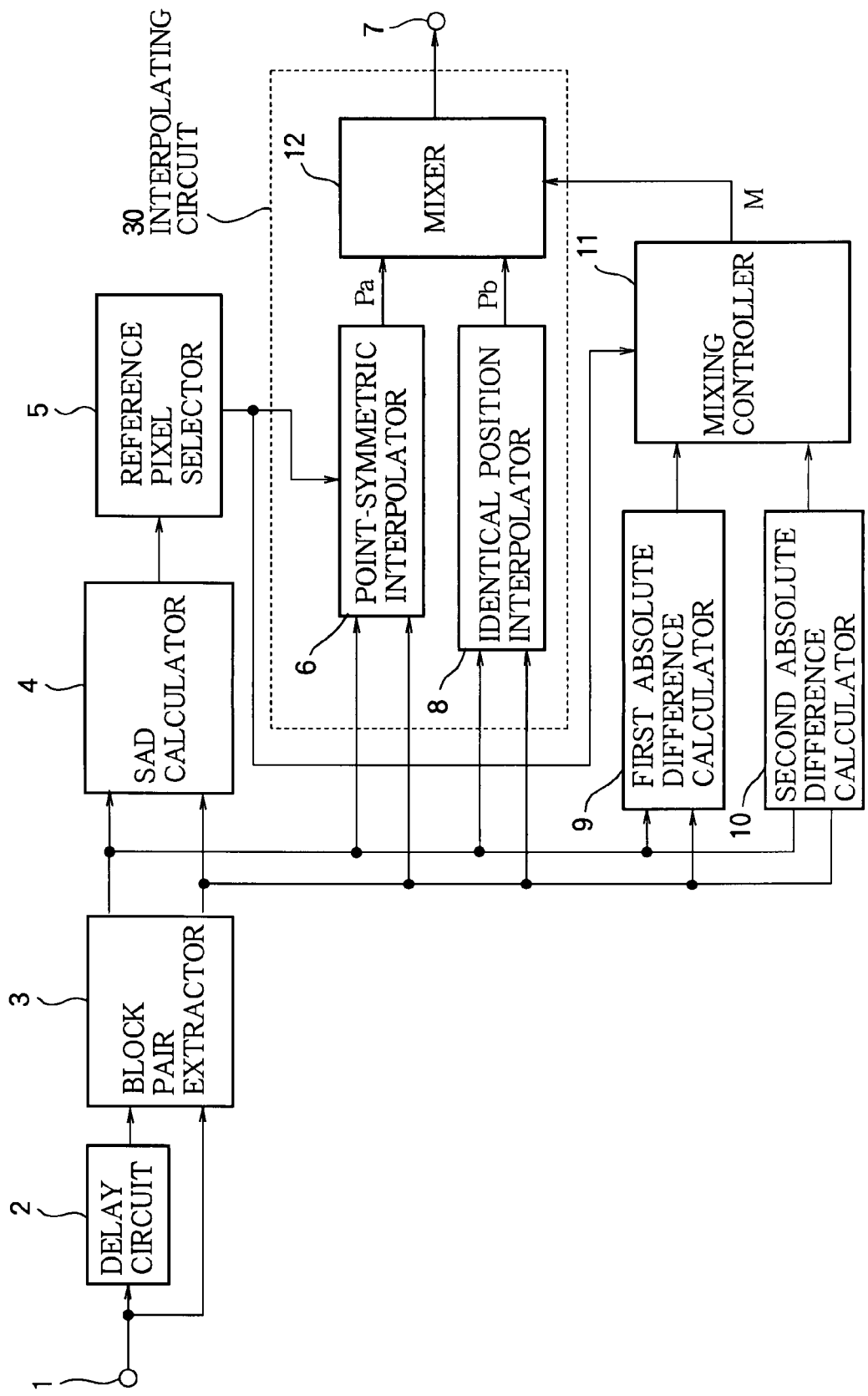
FIG. 14 is a block diagram of a frame interpolation apparatus according to a fifth embodiment of the invention.

The interpolation apparatus in FIG. 14 comprises the delay circuit 2, block pair extractor 3, SAD calculator 4, reference pixel selector 5, and point-symmetric interpolator 6 shown in FIG. 1, and also includes an identical position interpolator 8, a first absolute difference calculator 9, a second absolute difference calculator 10, a mixing controller 11, and a mixer 12. The point-symmetric interpolator 6, identical position interpolator 8, and mixer 12 constitute an interpolating circuit 30. The components having the same reference characters as in FIG. 1 perform the same operations as in the first embodiment.

The identical position interpolator 8 averages the values of the pixels located at the same positions as the interpolation position in the first and second reference frames and outputs the result (Pb) to the mixer 12.

The first absolute difference calculator 9 calculates the absolute differences between the central pixel in a pixel block extracted by the block pair extractor 3 from the first reference frame as one part of a pair of pixel blocks and the pixel located at the same position (with the same vertical and horizontal coordinates) in the second reference frame, and outputs the calculated result to the mixing controller 11.

Similarly, the second absolute difference calculator 10 calculates the absolute differences between the central pixel in the pixel block extracted by the block pair extractor 3 from the second reference frame as the other part of the pixel block pair and the pixel located at the same position (with at the same vertical and horizontal coordinates) in the first reference frame, and outputs the calculated result to the mixing controller 11.

The values of the calculated absolute differences represent the amount of change in the image between the first and second reference frames.

The mixing controller 11 selects the larger one of the absolute differences output from the first and second absolute difference calculators 9, 10 for the pixel block pair selected by the reference pixel selector 5, generates a mixing coefficient M proportional to the selected absolute difference, and outputs it to the mixer 12.

When the mixing coefficient M is equal to or greater than a predetermined value Thm, the mixer 12 selects the output signal Pa of the point-symmetric interpolator 6 as in the first embodiment and outputs it to the output terminal 7; when M is less than Thm, the mixer 12 mixes the output signal Pa of the point-symmetric interpolator 6 and the output signal Pb of the identical position interpolator 8 in a ratio proportional to the mixing coefficient M, and outputs the result to the output terminal 7. As the mixing coefficient becomes larger, the proportion $\alpha$ ($0 \leq \alpha 1$) of the output signal Pa of the point-symmetric interpolator 6 in the ratio increases and the proportion $\beta$ ($\beta = 1 - \alpha$) of the output signal Pb of the identical position interpolator 8 decreases.

Figure 15:
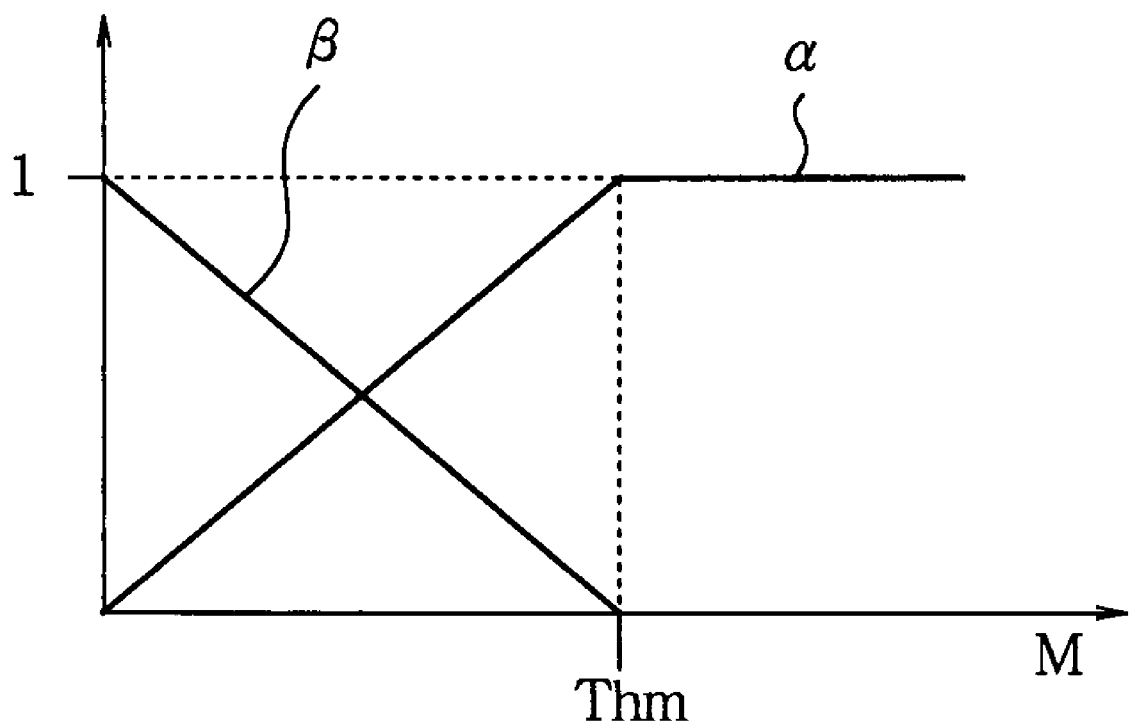
FIG. 15 is a graph illustrating mixing ratios used in the fifth embodiment.

FIG. 15 illustrates the relation between the mixing coefficient M and the mixed proportions $\alpha$, $\beta$ of the output signals Pa, Pb described above.

As described above, in the fifth embodiment, the interpolating circuit 30 comprising the point-symmetric interpolator 6, the identical position interpolator 8, and the mixer 12 generates two values for the pixel to be interpolated, one value derived from the reference pixels selected by the reference pixel selector 5 and the other value derived from reference pixels located at the same position as the interpolation position in the first and second reference frames, and combines these two values according to the mixing coefficient M generated by the mixing controller 11. In a still image with no change from the first reference frame to the second reference frame, M is zero, the interpolation result Pb obtained by using the reference pixels located at the same position as the interpolation position is used, and the point-symmetric interpolation result Pa is ignored. As the amount of change between the first and second reference frames increases, the combination includes a decreasing proportion of the identical position interpolation result Pb and an increasing proportion of the point-symmetric interpolation result Pa. When the amount of change exceeds the threshold value Thm, only the point-symmetric interpolation result Pa is used.

The fifth embodiment accordingly distinguishes between still and moving images and uses an interpolation method or a blend of interpolation methods appropriate for the amount of change in the image.

Sixth Embodiment

In the first embodiment, the central pixels in the blocks of a pixel block pair having the greatest calculated similarity (the smallest SAD value) are always selected as reference pixels. When even the greatest calculated similarity indicates low degree of similarity (below a predetermined threshold value), however, it is possible to interpolate more accurately by using the average of the pixels at the same position as the interpolation position in the first and second reference frames.

Figure 16:
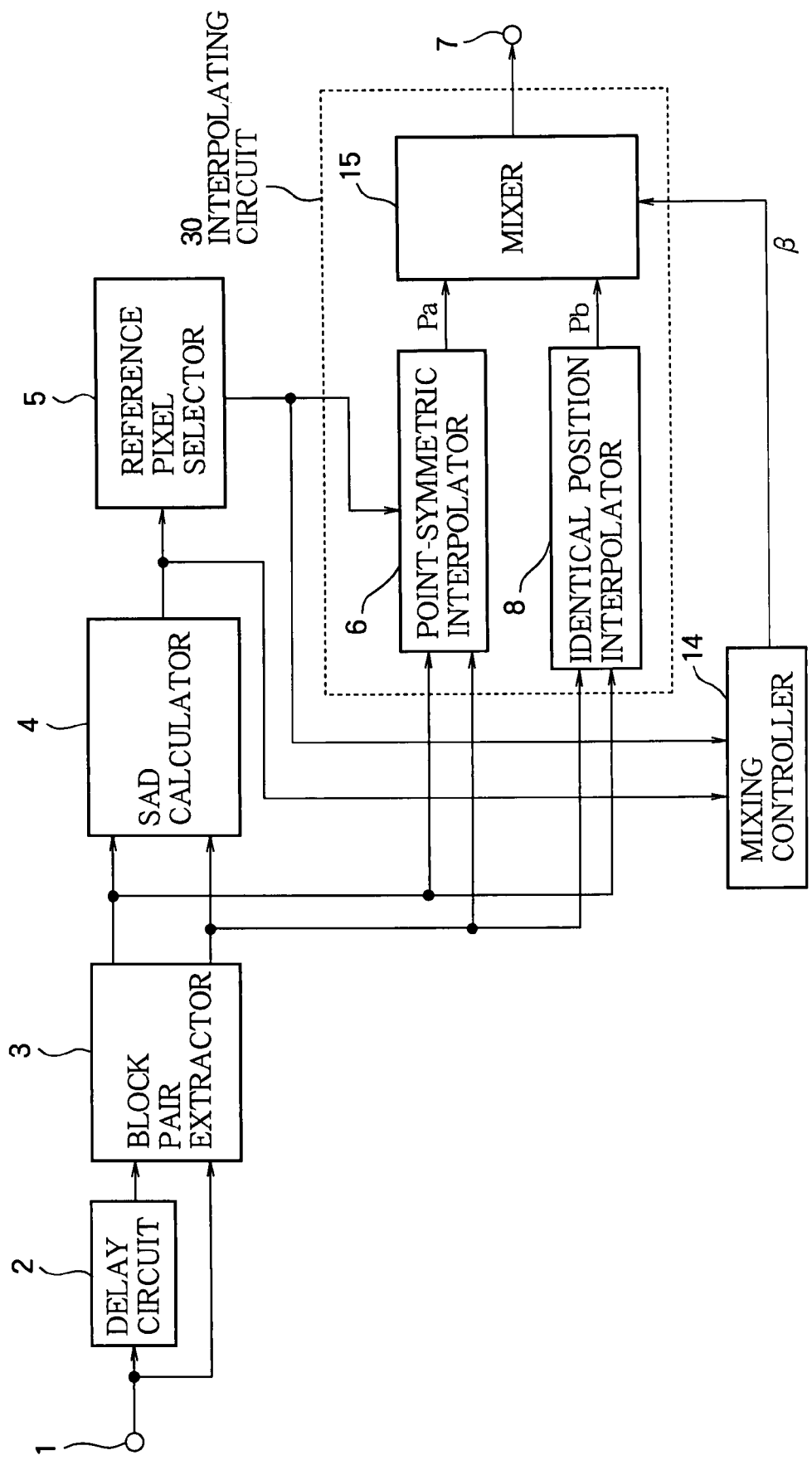
FIG. 16 is a block diagram of a frame interpolation apparatus according to a sixth embodiment of the invention.

Referring to FIG. 16, the structure of the frame interpolation apparatus in the sixth embodiment is generally the same as in FIG. 1, but differs in that an identical position interpolator 8, a mixing controller 14, and a mixer 15 are added. The components having the same reference characters as in FIG. 1 perform the same operations as in the first embodiment.

The point-symmetric interpolator 6, the identical position interpolator 8, and the mixer 15 constitute an interpolating circuit 30 as in the fifth embodiment.

The identical position interpolator 8 averages the values of pixels at the same position as the interpolation position in the first and the second reference frames and outputs the result as an identical position interpolation value Pb to the mixer 15, in the same way as in FIG. 14.

The mixing controller 14 compares the sum of the absolute difference SAD between the pixel blocks of the pixel block pair selected by the reference pixel selector 5 as having the highest similarity, that is, the smallest SAD value, among the pixel block pairs the similarities of which are calculated by the SAD calculator 4 for the current interpolation position with two predetermined values Th1 and Th2 (Th1<Th2) and sends the mixer 15 a mixing coefficient $\beta$ according to the comparison result. The mixing coefficient $\beta$ is defined by the following equations (4A) to (4C).

If $0 \leq SAD < Th1$, $\beta = 0$ (4A)

If $Th1 \leq SAD < Th2$, $\beta = (SAD - Th1)/(Th2 - Th1)$ (4B)

If $Th2 \leq SAD$, $\beta = 1$ (4C)

Figure 17:
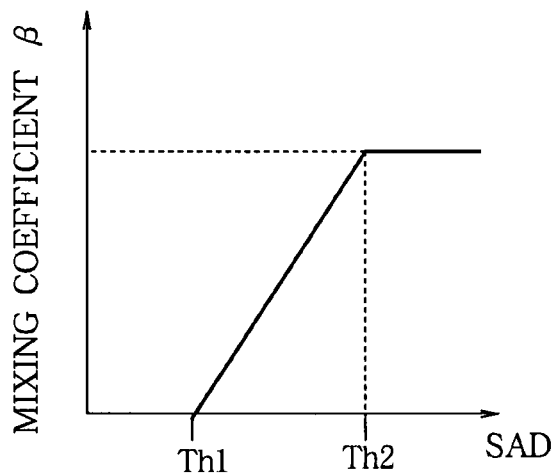
FIG. 17 is a graph illustrating a mixing ratio used in the sixth embodiment.

FIG. 17 illustrates the relationship between the SAD value and the mixing coefficient $\beta$.

The mixer 15 mixes the output Pa of the point-symmetric interpolator 6 and the output Pb of the identical position interpolator 8 according to the mixing coefficient $\beta$ output from the mixing controller 14 by using the following equation (5), and outputs the mixed result Pc to the output terminal 7.

$Pc = \{\beta \times Pb\} + \{(1-\beta) \times Pa\}$ (5)

The mixing ratio $\beta$ may be obtained by using a lookup table instead of the above equations (4A) to (4C).

Accordingly, in the sixth embodiment, when the SAD value is less than the first predetermined value Th1, indicating that the similarity exceeds the first threshold value, the mixer 15 sets $\beta$ equal to zero and outputs the point-symmetric interpolated value Pa obtained by using the reference pixels selected by the reference pixel selector 5.

When the SAD value is between the first predetermined value Th1 and second predetermined value Th2, indicating that the similarity is between the first and second threshold values, the mixer 15 sets $\beta$ to a value between zero and one, and mixes the point-symmetric interpolated value Pa with the identical-position interpolated value Pb, which is obtained using reference pixels at the same position as the interpolation position. The mixing ratio decreases with decreasing similarity.

When the SAD is equal to or greater than the second predetermined value Th2, indicating that the similarity is below the second threshold value, the interpolating circuit 30 sets $\beta$ equal to unity and outputs the identical-position interpolated value Pb.

By switching interpolation methods in this way, the sixth embodiment avoids the use of point-symmetric interpolation when the point-symmetric pixel blocks are not similar enough to warrant the use of this method, and provides a smooth transition between point-symmetric interpolation and identical-position interpolation when the similarity of the selected pixel blocks is neither high enough to accept point-symmetric interpolation completely nor low enough to reject it completely. This has the effect of producing a more accurately interpolated image.

Seventh Embodiment

The preceding embodiments have been concerned purely with the interpolation process, but in many applications it is also necessary to insert the interpolated frames into the video signal in such as way as to double the frame rate.

Figure 18:
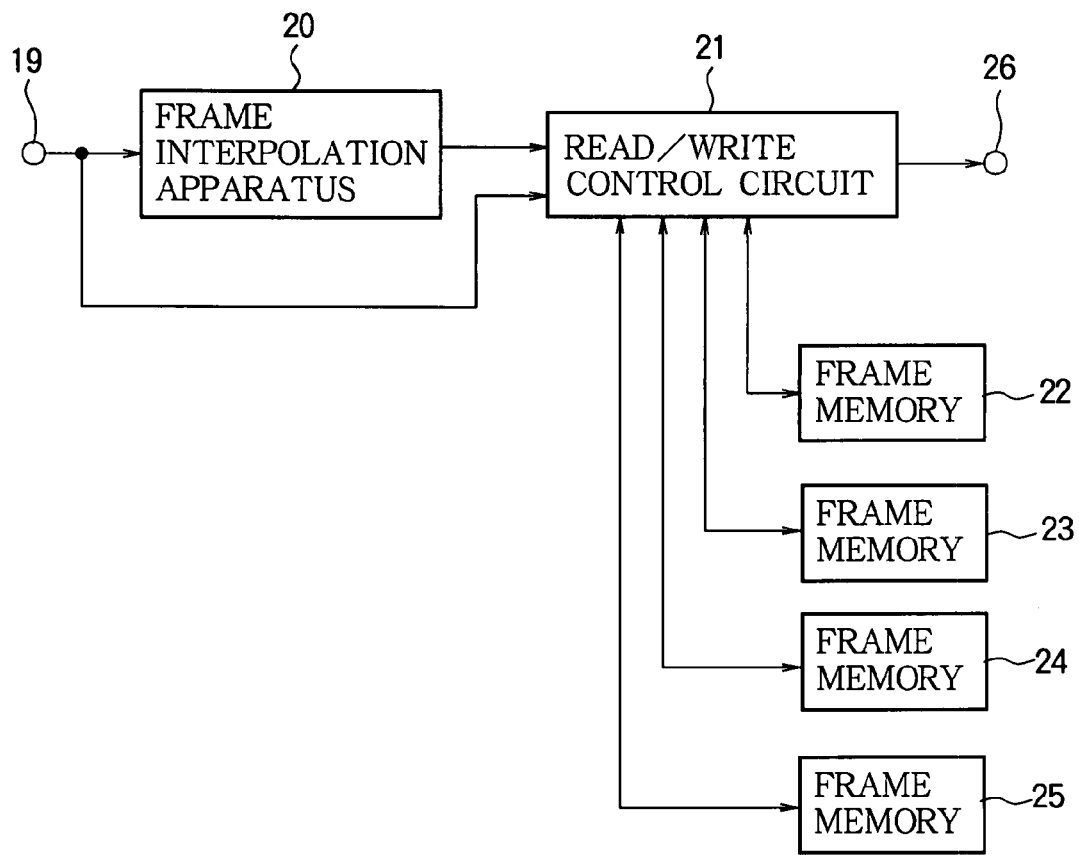
FIG. 18 is a block diagram of a frame interpolation apparatus according to a seventh embodiment of the invention.

FIG. 18 shows an apparatus for performing this type of frame rate conversion. The apparatus comprises an input terminal 19, a frame interpolation apparatus 20, a read/write control circuit 21, and four frame memories 22, 23, 24, 25.

The input terminal 19 receives a video signal comprising successive frames.

The frame interpolation apparatus 20 interpolates a frame between each two consecutive frames received at the input terminal 19, using the interpolation method described in any of the preceding embodiments.

The read/write control circuit 21 receives the original frames input at the input terminal 19 and writes them alternately into frame memory 22 and frame memory 23. The read/write control circuit 21 also receives the interpolated frames generated by the frame interpolation apparatus 20 and writes them alternately into frame memory 24 and frame memory 25.

At the same time, the read/write control circuit 21 reads frame data, one frame at a time, from the frame memories 22, 23, 24, 25 and supplies the data to the output terminal 26 as an output video signal. The read/write control circuit 21 reads original frames and interpolated frames alternately, in each case reading data from the frame memory to which data are not currently being written, at a read-out rate twice as fast as the data writing rate. The video signal output from the output terminal 26 accordingly has twice the frame rate of the video signal input at the input terminal 19.

Due to the use of the interpolation method described in any of the preceding embodiments in the frame interpolation apparatus 20, the video signal output at the input terminal 19 is substantially free of blur, judder, and the other problems noted in the prior art.

Eighth Embodiment

The fourth, fifth, and sixth embodiments used different methods of mitigating unreliable motion detection by using reference pixels at the same position as the interpolation position, instead of or in combination with the point-symmetric reference pixels selected on the basis of block similarity. An alternative strategy that can be followed when the selected reference pixels appear to be unreliable is to use reference pixels in previously selected positions, for example, the same positions as used in interpolating the same pixel in the preceding interpolated frame.

Figure 19:
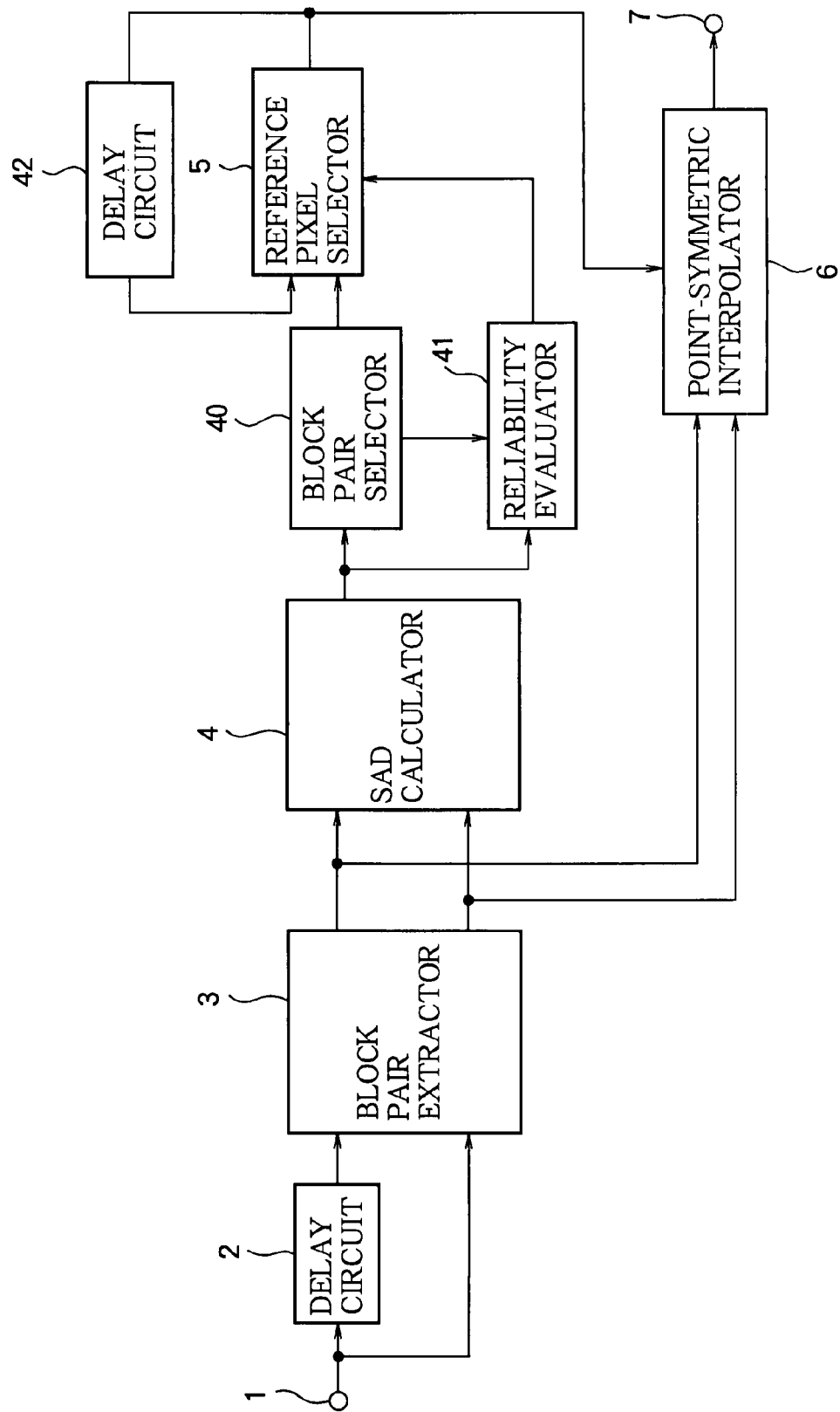
FIG. 19 is a block diagram of a frame interpolation apparatus according to an eighth embodiment of the invention.

FIG. 19 shows the structure of a frame interpolation apparatus in which this strategy is adopted. This apparatus adds a block pair selector 40, a reliability evaluator 41, and a delay circuit 42 to the structure of the first embodiment shown in FIG. 1. The reference pixel selector 5 also operates differently from the reference pixel selector 5 in the first embodiment.

The input terminal 1, delay circuit 2, block pair extractor 3, and SAD calculator 4 operate as described in the first embodiment to extract sixty pixel block pairs and calculate a sum of absolute differences (SAD) for each pair.

The block pair selector 40 selects the pixel block pair having the highest mutual similarity, that is, the least SAD value, as a candidate block pair. In addition, the block pair selector 40 examines the pixel block pairs that are not in a certain positional neighborhood of the candidate block pair, and selects from among these pixel block pairs the pixel block pair having the highest mutual similarity as an evaluation block pair. The block pair selector 40 passes information specifying the position of the candidate block pair to the reference pixel selector 5, and passes the similarity indexes (SAD values) of the candidate block pair and evaluation block pair to the reliability evaluator 41.

In this embodiment, the position of a pixel block pair is defined by the line joining the centers of the two pixel blocks in the pair, that is, by the position of the pixel at the center of the block extracted from the second reference frame relative to the position of the pixel at the center of the block extracted from the first reference frame.

Figure 20:
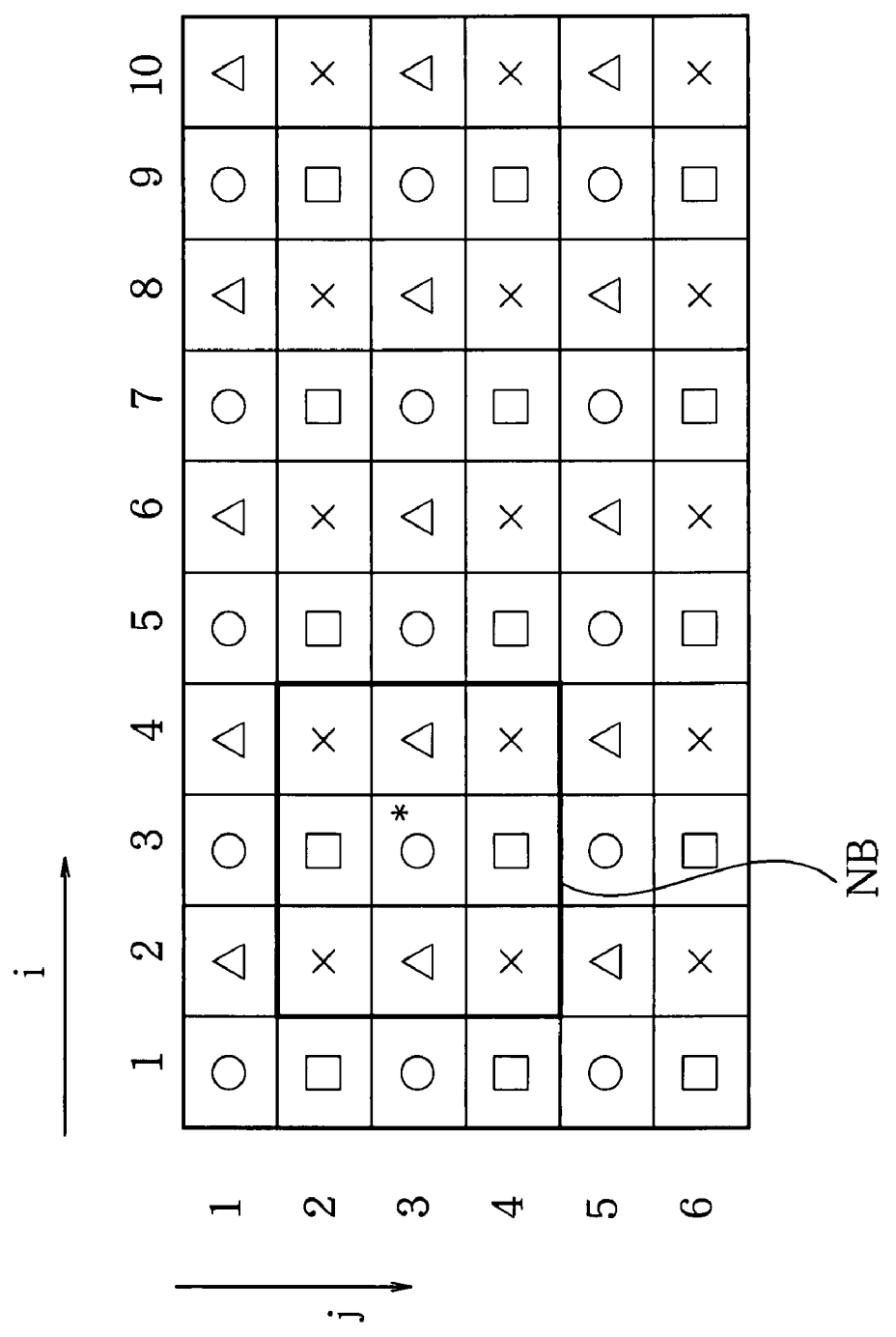

The positions of the sixty extracted pixel block pairs can be mapped onto a matrix with six rows and ten columns as shown, for example, in FIG. 20. The position of a pixel block pair is given by a pair of coordinates (i, j), where i is the horizontal coordinate (the column number) and j is the vertical coordinate (the row number). The origin (1, 1) of this coordinate system is in the upper left. The matrix element with these coordinates (i=1 and j=1) represents the pixel block pair consisting of the pixel blocks in FIGS. 3(a) and 4(a).

The horizontal coordinate (i) increases as the central pixel in the pixel block in the first reference frame moves to the right and as the central pixel in the pixel block in the second reference frame moves to the left. The vertical coordinate (j) increases as the central pixel in the pixel block in the first reference frame moves down and as the central pixel in the pixel block in the second reference frame moves up. Accordingly, the matrix element with coordinates i=3 and j=1 represents the pixel block pair consisting of the pixel blocks in FIGS. 3(b) and 4(b); the matrix element with coordinates i=5 and j=1 represents the pixel block pair consisting of the pixel blocks in FIGS. 3(c) and 4(c); the matrix element with coordinates i=9 and j=5 represents the pixel block pair consisting of the pixel blocks in FIGS. 3(d) and 4(d).

In general, if f is 0, 1, 2, 3, or 4 and g is 0, 1, or 2, the matrix element indicated by a circle in FIG. 20 with coordinates i=1+(2f), j=1+(2g) represents a pair of pixel blocks that are point-symmetric with respect to the interpolation position, as illustrated in FIGS. 3(a) to 3(d) and 4(a) to 4(d).

The matrix element with coordinates i=2 and j=1 represents the pixel block pair consisting of the pixel blocks in FIGS. 3(a) and 5(a).

Figure 3B:
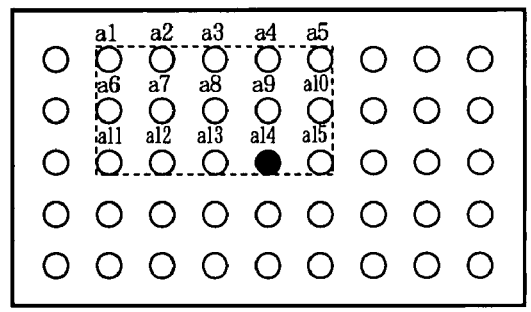

The matrix element with coordinates i=4 and j=1 represents the pixel block pair consisting of the pixel blocks in FIGS. 3(b) and 5(b).

Figure 3C:
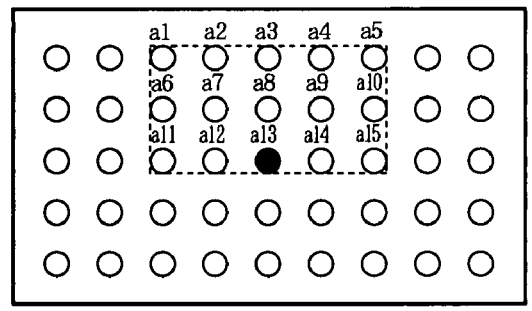

The matrix element with coordinates i=6 and j=1 represents the pixel block pair consisting of the pixel blocks in FIGS. 3(c) and 5(c).

Figure 3D:
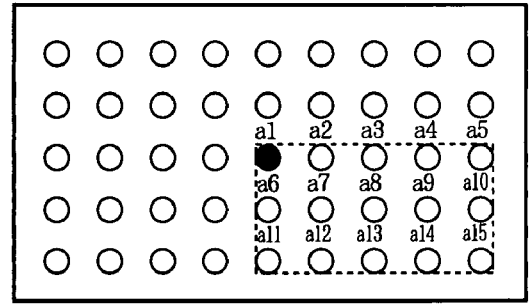
Figure 4:
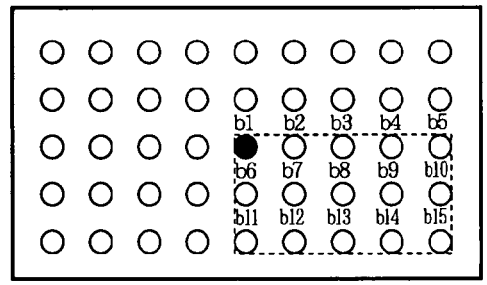
FIGS. 4(a), 4(b), 4(c), and 4(d) illustrate point-symmetric pixel blocks in a second reference frame.
Figure 4:
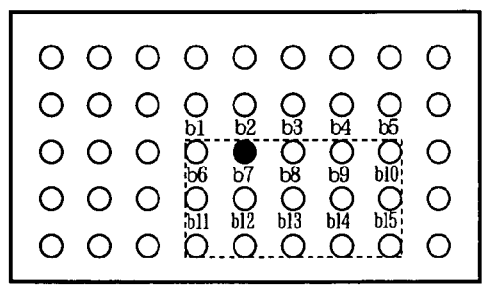
Figure 4:
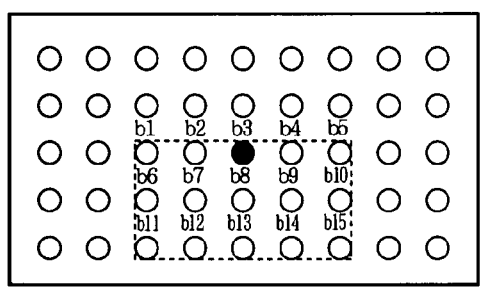
Figure 4:
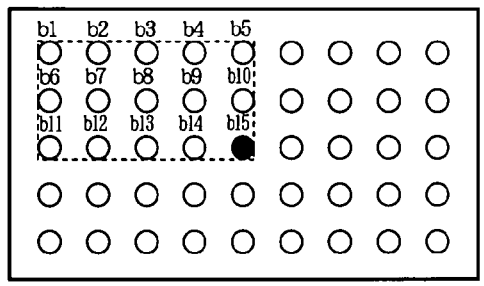

The matrix element with coordinates i=10 and j=5 represents the pixel block pair consisting of the pixel blocks in FIGS. 3(d) and 5(d).

In general, the matrix element indicated by a triangle with coordinates i=2+(2f), j=1+(2g) in FIG. 20 (where f=0, 1, 2, 3, or 4 and g=0, 1, or 2) represents a pair of pixel blocks in which the pixel block in the second reference frame is shifted by one pixel to the left from the point-symmetric position, as illustrated in FIGS. 3(a) to 3(d) and 5(a) to 5(d).

The matrix element indicated by a square with coordinates i=1+(2f), j=2+(2g) in FIG. 20 represents a pair of pixel blocks in which the pixel block in the second reference frame is shifted upward by one pixel from the point-symmetric position.

The matrix element indicated by a cross with coordinates i=2+(2f), j=2+(2g) in FIG. 20 represents a pair of pixel blocks in which the pixel block in the second reference frame is shifted diagonally upward and to the left by one pixel from the point-symmetric position.

The positional neighborhood of the candidate block pair includes the candidate block pair itself and the eight pixel block pairs in neighboring positions immediately above, below, to the right, to the left, and diagonally above and below and to the right and left of the candidate block pair position in the matrix in FIG. 20. If the candidate block pair is the pair represented by the matrix element with coordinates i=3, j=3, marked with an asterisk (*) in FIG. 20, its positional neighborhood is the set of pixel block pairs represented by the matrix elements surrounded by the thick line NB.

The positional neighborhood shown in FIG. 20 can be described as the set of pixel block pairs within a horizontal or vertical distance of one pixel from the candidate block pair position. A more general positional neighborhood can be defined as the set of pixel block pairs within a horizontal or vertical distance of R pixels position from the candidate block pair position, where R is any appropriate positive integer, and this generalized positional neighborhood can be used as the positional neighborhood in the present embodiment.

The reliability evaluator 41 calculates the average similarity index, that is, the average SAD value, of all of the pixel block pairs extracted by the block pair extractor 3, and evaluates the reliability of the candidate block pair in terms of its similarity index, the similarity index of the evaluation block pair, and the average similarity index. Specifically, the reliability evaluator 41 determines whether the following condition (2a) is satisfied.

$$(Se-Sc) \times B > (Sa-Se) \quad (2a)$$

where Se is the SAD value used as the similarity index of the evaluation block pair, Sc is the SAD value used as the similarity index of the candidate block pair, Sa is the average SAD value expressing the average similarity of the two blocks in all extracted pixel block pairs, and B is a constant greater than one. For example, B may be equal to two.

Condition (2a) can be rewritten in the following form (2b):

$$\{(B+1)/B\} \times (Sa-Se) < (Sa-Sc) \quad (2b)$$

The reliability evaluator 41 outputs the truth value of this condition to the reference pixel selector 5.

When condition (2a) is satisfied (true), the difference, multiplied by B (B>1), between the candidate block pair similarity and the evaluation block pair similarity is greater than the difference between the evaluation block pair similarity and the average block pair similarity. Restated as condition (2b), this implies that the difference between the candidate block pair similarity and the average similarity is more than (B+1)/B times as large as the difference between the evaluation block pair similarity and the average similarity. Both of these equivalent conditions mean that the similarity of the candidate block pair is significantly larger than other similarities outside its positional neighborhood; that is, that the highest similarity peak is significantly higher than other similarity peaks.

Figure 21:
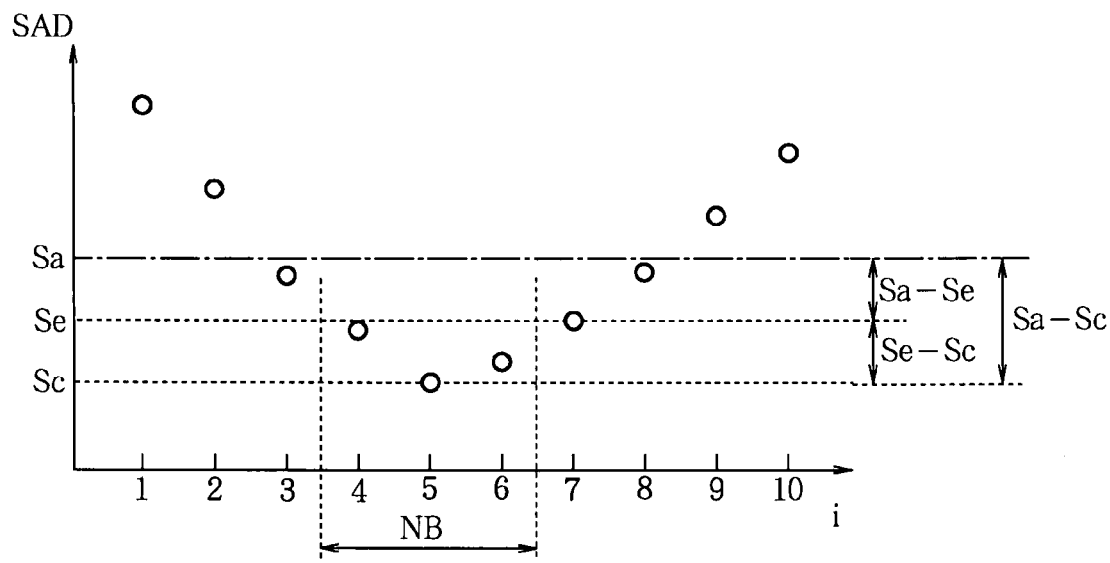
FIGS. 21 and 22 are graphs of similarity values in one row of the matrix in FIG. 20, illustrating the reliability evaluation performed in the eighth embodiment.
Figure 22:
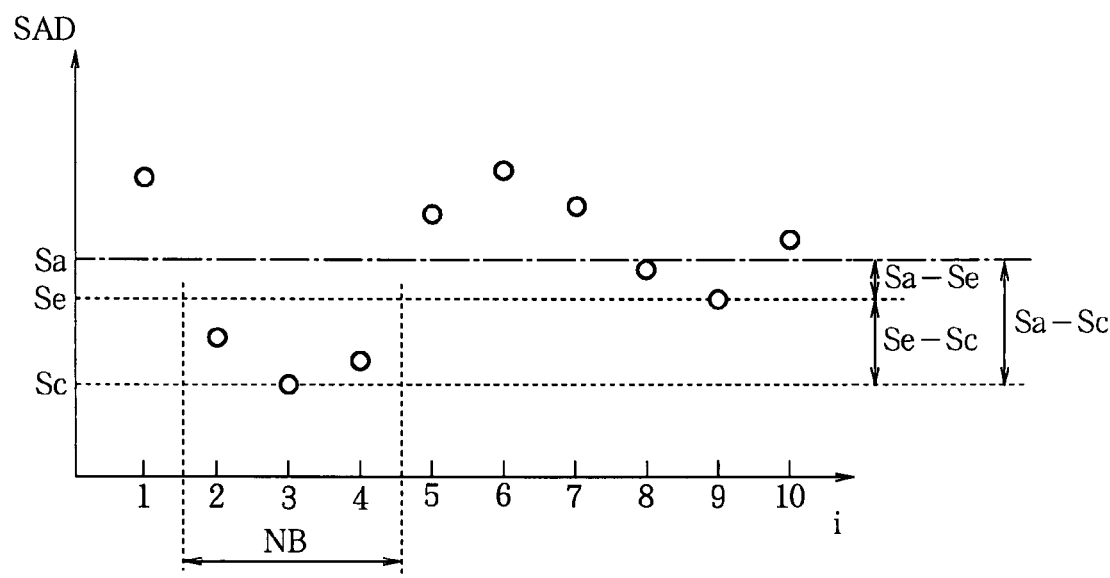

To clarify this explanation, FIGS. 21 and 22 show two examples of the SAD values calculated by the SAD calculator 4 for pixel block pairs corresponding to one row of elements in the matrix in FIG. 20. This row is assumed to include both the candidate block pair and the evaluation block pair. In FIG. 21 the candidate block pair is at position i=5 and the pixel block pairs at positions i=4 and i=6 are in its positional neighborhood NB. In FIG. 22 the candidate block pair is at position i=3 and the pixel block pairs at positions i=2 and i=4 are in its positional neighborhood NB.

Although the pixel block pairs are located at discrete positions, 'position' is an inherently continuous quantity, and for typical images, similarity varies continuously with position. The SAD values shown in FIGS. 21 and 22 can be easily regarded as points on a continuous curve. Since smaller SAD values indicate greater similarity, the valleys in these curves correspond to similarity peaks. The candidate block pair corresponds to the lowest valley (representing the highest similarity peak). The SAD values in its positional neighborhood are naturally close to the SAD value at this similarity peak.

Both the candidate block pair and the evaluation block pair have greater than average similarity; that is, their SAD values Sc and Se are lower than the average SAD value Sa.

In FIG. 21, the first difference (Se−Sc) between the candidate block pair similarity and the evaluation block pair similarity is equal to the second difference (Sa−Se) between the evaluation block pair block pair similarity and the average similarity. This reflects a well-defined similarity peak at i=5. Since the constant B is greater than unity, the first difference (Se−Sc) multiplied by B is greater than the second difference (Sa−Se), so the above conditions (2a and 2b) are true and the reference pixel selector 5 accepts the candidate block pair selected by the block pair selector 40.

In FIG. 22 there are two similarity peaks, but the candidate similarity peak at i=3 is much higher (its SAD value is much lower) than the evaluation similarity peak at i=9. The difference (Sa−Sc) between the peak at i=3 and the average similarity is more than twice as great as the difference (Sa−Se) between the peak at i=9 and the average similarity, indicating that the candidate blocks are significantly more similar than the evaluation blocks. The difference (Se−Sc) between the peaks at i=3 and i=9 is also greater than the difference (Sa−Se) between the peak at i=9 and the average similarity. Once again the above conditions (2a and 2b) are satisfied and the candidate block pair is selected.

The delay circuit 42 delays the positional information output by the reference pixel selector 5 by one frame period, for example, and supplies the delayed information to the reference pixel selector 5 so that the reference pixel selector 5 can use the same relative positions again, if necessary, for interpolation at the same interpolation position in the next interpolated frame.

When the reliability evaluator 41 indicates that conditions 2a and 2b are true, the reference pixel selector 5 accepts the candidate block pair selected by the block pair selector 40 and the point-symmetric interpolator 6 interpolates the same pixel value as in the first embodiment.

When the reliability evaluator 41 indicates that conditions 2a and 2b are false, the reference pixel selector 5 rejects the candidate block pair and uses the delayed positional information received from the delay circuit 42, thereby selecting, for example, the reference pixel positions that were used for interpolating a pixel at the same interpolation position in the preceding interpolated frame.

Accordingly, once a pair of reference pixel positions has been selected in the eighth embodiment, the reference pixel selector 5 continues to use these reference pixel positions for future interpolation (e.g., for interpolation at the same interpolation position in succeeding frames) unless the block similarity values calculated by the SAD calculator 4 give strong cause for using a different pair of reference pixel positions. As a result, interpolation is performed with more temporal consistency than in the preceding embodiments.

Ninth Embodiment

Figure 23:
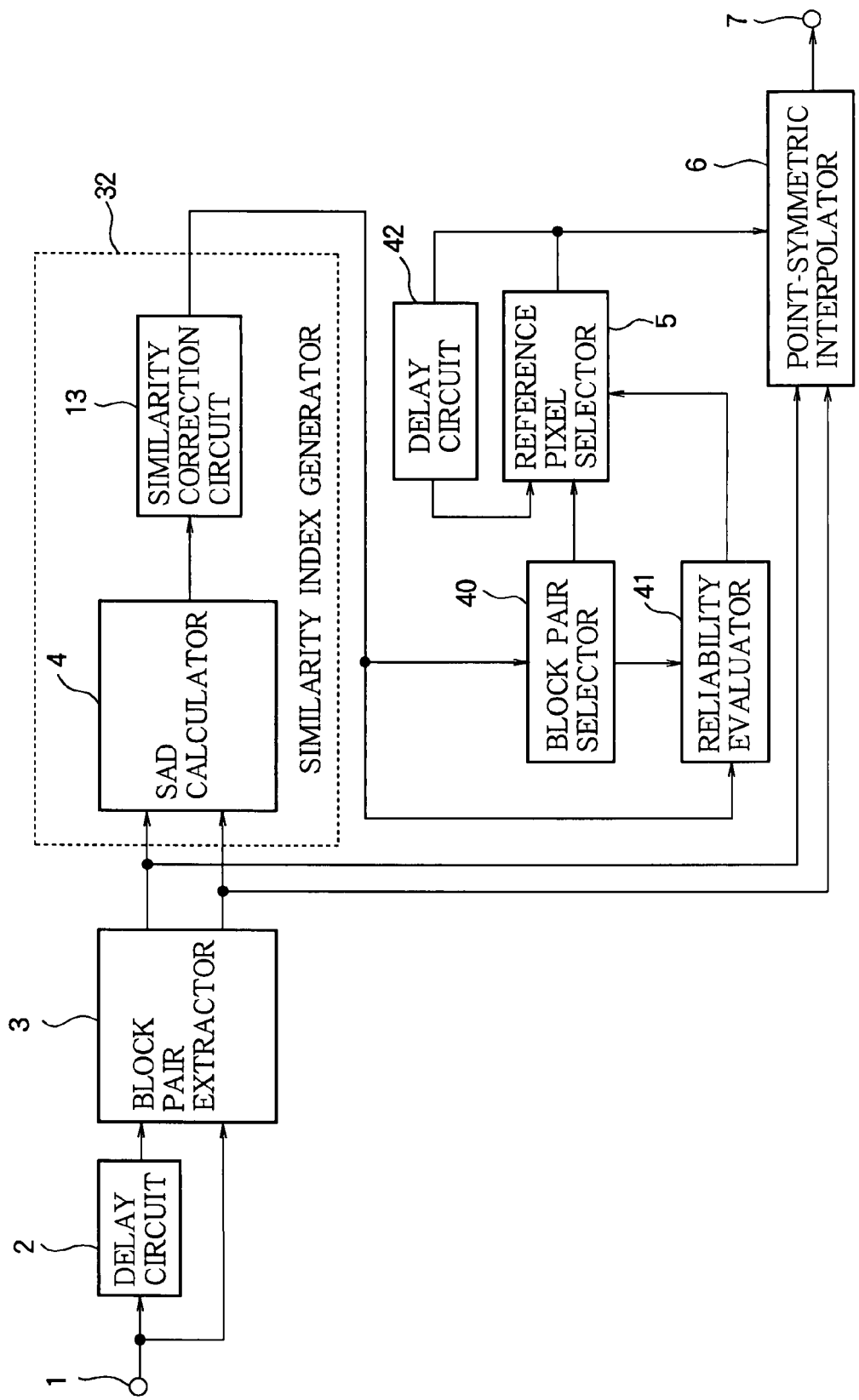
FIG. 23 is a block diagram of a frame interpolation apparatus according to a ninth embodiment of the invention.

Referring to FIG. 23, the ninth embodiment combines the features of the second and eighth embodiments. As in the second embodiment, the similarity index generator 32 outputs corrected similarity index values SI which the similarity correction circuit 13 obtains by multiplying the values output from the SAD calculator 4 by a coefficient K that increases with increasing distance of the pixel blocks from the interpolation position. The block pair selector 40 uses the corrected similarity index values to select a candidate block pair and an evaluation block pair, in the same way that the uncorrected similarity values (SAD values) were used in the eighth embodiment. The reliability evaluator 41 tests the condition (2a or 2b) given in the eighth embodiment, using the corrected similarity index values as similarity values Sc and Se and calculating the average of the corrected similarity index values SI for all pixel block pairs as the average similarity value Sa. The reference pixel selector 5 outputs reference pixel positions taken from the candidate block pair when the tested condition is true, and reuses previously selected reference pixel positions, supplied by the delay circuit 42, when the tested condition is false.

By combining the advantages of the second and eighth embodiments, the ninth embodiment produces further improvements in interpolation accuracy.

Tenth Embodiment

Figure 24:
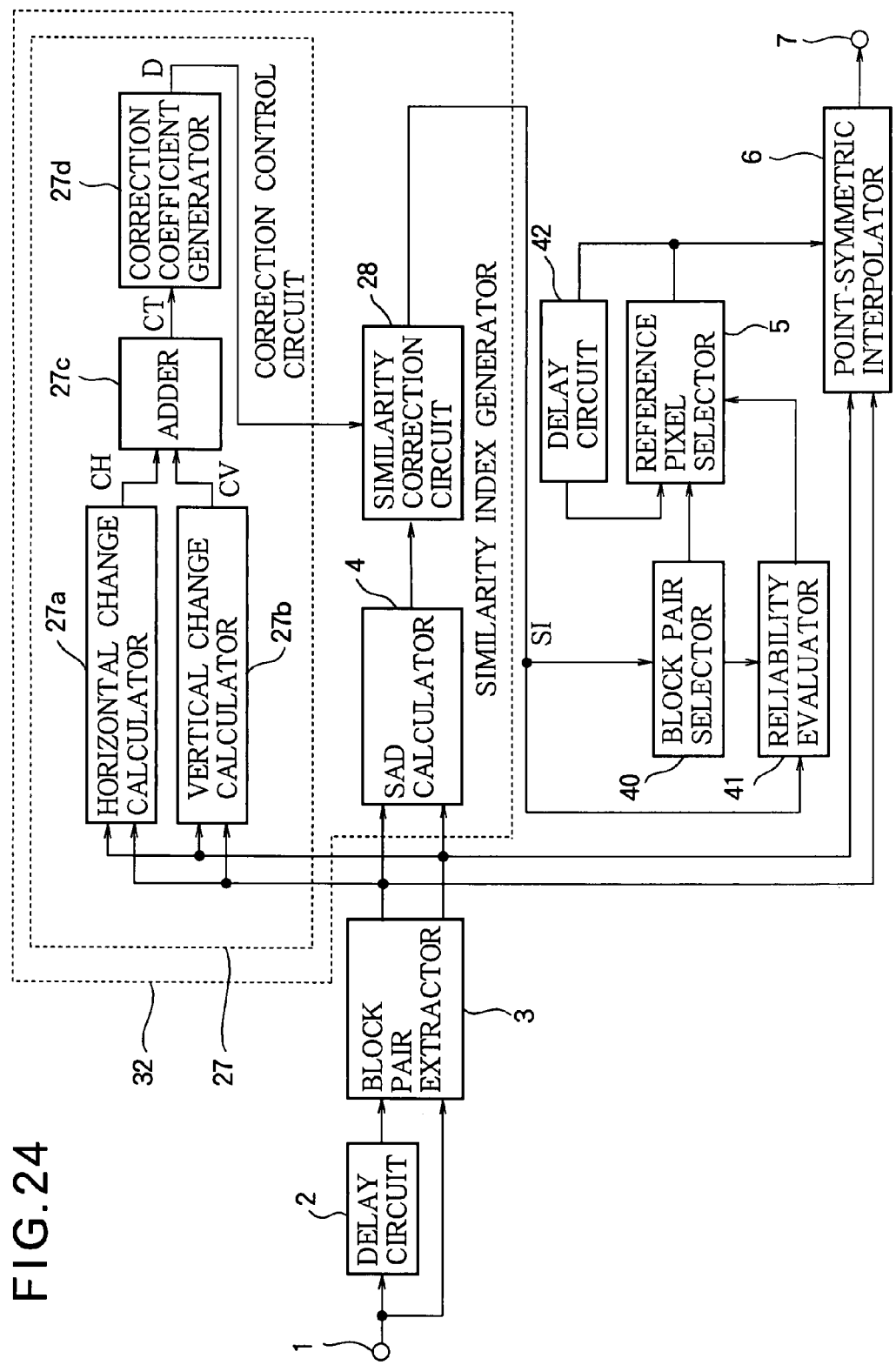
FIG. 24 is a block diagram of a frame interpolation apparatus according to a tenth embodiment.

Referring to FIG. 24, the tenth embodiment combines the features of the third and eighth embodiments. The similarity index generator 32 outputs similarity index values SI that are corrected for image flatness as explained in the third embodiment. The block pair selector 40 and reliability evaluator 41 use the corrected similarity index values SI as described in the ninth embodiment, that is, in the same way as the uncorrected SAD values were used in the eighth embodiment. The reference pixel selector 5 and delay circuit 42 operate as described in the eighth embodiment.

By combining the advantages of the third and eighth embodiments, the tenth embodiment also produces further improvements in interpolation accuracy.

Eleventh Embodiment

Figure 25:
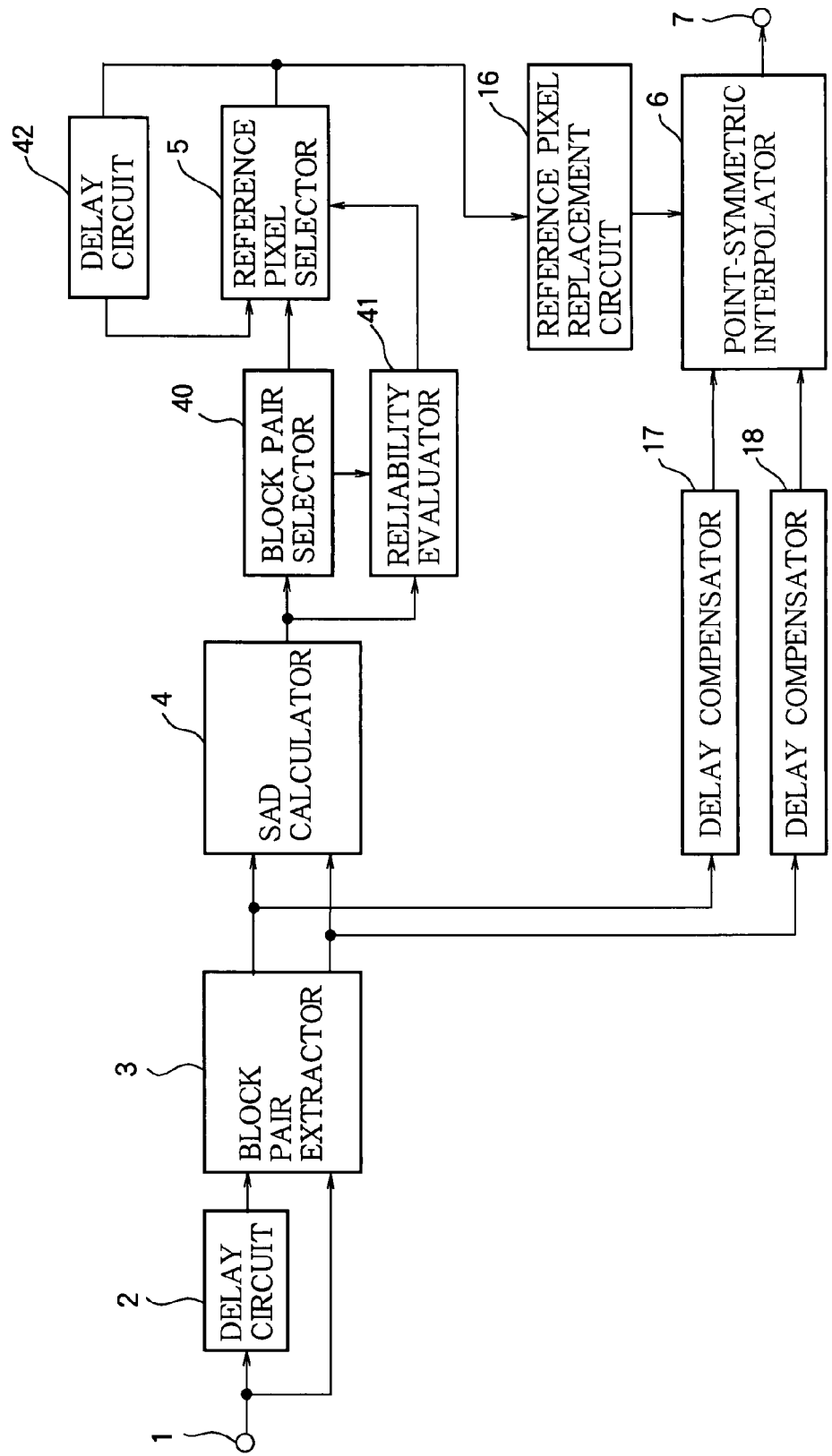
FIG. 25 is a block diagram of a frame interpolation apparatus according to an eleventh embodiment.

Referring to FIG. 25, the eleventh embodiment combines the features of the fourth and eighth embodiments. As in the eighth embodiment, the block pair selector 40 selects a candidate block pair and an evaluation block pair, the reliability evaluator 41 uses the evaluation block pair to evaluate the reliability of the candidate block pair, and the reference pixel selector 5 either outputs reference pixel positions taken from the candidate block pair or outputs previously selected reference pixel positions supplied by the delay circuit 42, depending on the result reported by the reliability evaluator 41. As in the fourth embodiment, the reference pixel replacement circuit 16 replaces the reference pixel positions output by the reference pixel selector 5 with reference pixel positions identical to the interpolation position when the reference pixel positions output by the reference pixel selector 5 are inconsistent with preceding or following reference pixel positions, and the delay compensators 17, 18 provide the delays needed to allow for the processing in the reference pixel replacement circuit 16.

By combining the advantages of the fourth and eighth embodiments, the eleventh embodiment also produces further improvements in interpolation accuracy.

The features of the preceding embodiments may be combined in various other ways. For example, the frame interpolation apparatus in the second or third embodiment may also include the reference pixel replacement circuit 16 in the fourth embodiment.

The similarity correction circuit 13 in the second embodiment may be used with the correction control circuit 27 and the correction circuit 28 in the third embodiment. In this case, the similarity index corrected by the similarity correction circuit 13 may further be corrected by the correction circuit 28, or it may be combined with the similarity index corrected by the correction circuit 28 (e.g., by averaging the two corrected similarity values).

The first absolute difference calculator 9, the second absolute difference calculator 10, the mixing controller 11, the identical position interpolator 8, and the mixer 12 in the fifth embodiment may be combined with the frame interpolation apparatus in any of the second to fourth embodiments; the mixing controller 14 and the identical position interpolator 8 in the sixth embodiment may be combined with the frame interpolation apparatus in any of the second to fourth embodiments.

The thinning of pixel blocks and other variations described in detail in the first embodiment are applicable to any of the second to eleventh embodiments.

Those skilled in the art will recognize that further variations are possible within the scope of the invention, which is defined in the appended claims.

What is claimed is:
1. A frame interpolation apparatus for generating a pixel value at an interpolation position in a frame interpolated between a first reference frame and a second reference frame, comprising:
a block pair extractor for extracting a plurality of pixel block pairs, each pixel block pair including a first pixel block occupying a first position in the first reference frame and a second pixel block occupying a second position in the second reference frame, the first and second positions being substantially point-symmetric with respect to the interpolation position, wherein the extracted pixel block pairs include at least one pixel block pair where the first and the second positions are exactly point-symmetric with respect to the interpolation position, and at least one pixel block pair where the second position differs from a position exactly point-symmetric to the first position, the difference being at most one pixel position horizontally and vertically;
a similarity index generator for calculating, for each pixel block pair extracted by the block pair extractor, a similarity index indicating a degree of mutual similarity between the first and second pixel blocks in the pixel block pair, based on values of pixels in the first and second pixel blocks;
a reference pixel selector for selecting a first reference pixel from a central position in the first pixel block in a pixel block pair of maximum similarity, as indicated by the calculated similarity indexes, and selecting a second reference pixel from a central position in the second pixel block in the pixel block pair of maximum similarity; and
a first interpolator for calculating the pixel value at the interpolation position from values of the first and second reference pixels.
2. The frame interpolation apparatus of claim 1, wherein the block pair extractor selects pixel block pairs in which the first and second positions are exactly point-symmetric with respect to the interpolation position and pixel block pairs in which the second position is displaced horizontally by one pixel from the position exactly point-symmetric to the first position.

3. The frame interpolation apparatus of claim 1, wherein the block pair extractor selects pixel block pairs in which the first and second positions are exactly point-symmetric with respect to the interpolation position and pixel block pairs in which the second position is displaced vertically by one pixel from the position exactly point-symmetric to the first position.

4. The frame interpolation apparatus of claim 1, wherein the block pair extractor selects pixel block pairs in which the first and second positions are exactly point-symmetric with respect to the interpolation position and pixel block pairs in which the second position is displaced horizontally and vertically by one pixel from the position exactly point-symmetric to the first position.

5. The frame interpolation apparatus of claim 1, wherein the similarity index generator comprises a calculator that calculates a sum of absolute differences between values of pixels in corresponding positions in the first and second pixel blocks in each extracted pixel block pair.

6. The frame interpolation apparatus of claim 5, wherein the calculator calculates said sum from the values of an evenly distributed subset of the pixels in the first and second pixel blocks.

7. The frame interpolation apparatus of claim 5, wherein the similarity index generator further comprises a similarity correction circuit for multiplying said sum by a coefficient that increases with increasing distance between the centers of the first and second pixel blocks.

8. The frame interpolation apparatus of claim 5, wherein the similarity index generator further comprises a correction circuit for multiplying said sum by a coefficient that decreases with increasing total variation between values of adjacent pixels in the first pixel block and between values of adjacent pixels in the second pixel block.

9. The frame interpolation apparatus of claim 1, further comprising a reference pixel replacement circuit that stores relative position information for a plurality of horizontally consecutive interpolation positions, the relative position information indicating the position of the first reference pixel selected by the reference pixel selector relative to the interpolation position, and replaces the first and second pixels selected by the reference pixel selector for a current interpolation position with reference pixels in positions identical to the current interpolation position in the first and second reference frames whenever the relative position information for the current interpolation position indicates that the first reference pixel is left of the current interpolation position and the relative position information for any one of a predetermined number of preceding interpolation positions is inconsistent with the relative position information for the current interpolation position, and whenever the relative position information for the current interpolation position indicates that the first reference pixel is left of the current interpolation position is right of the current interpolation position and the relative position information for any one of the predetermined number of following interpolation positions is inconsistent with the relative position information for the current interpolation position.

10. The frame interpolation apparatus of claim 1, further comprising:
a second interpolator for calculating the pixel value at the interpolation position from values of the pixels at positions identical to the interpolation position in the first and second reference frames;
a first absolute difference calculator (9) for calculating a first absolute difference between the value of the first reference pixel and a value of a pixel at a position in the second reference frame identical to the position of the first reference pixel;
a second absolute difference calculator for calculating a second absolute difference between the value of the second reference pixel and a value of a pixel at a position in the first reference frame identical to the position of the second reference pixel;
a mixing controller for calculating a mixing ratio from the first absolute difference and the second absolute difference; and
a mixer for combining the pixel value calculated by the first interpolator with the pixel value calculated by the second interpolator in the mixing ratio calculated by the mixing controller.

11. The frame interpolation apparatus of claim 1, further comprising:
a second interpolator for calculating the pixel value at the interpolation position from values of the pixels at positions identical to the interpolation position in the first and second reference frames;
a mixing controller for calculating a mixing ratio that increases as the maximum similarity index calculated by the similarity index generator indicates decreasing similarity; and
a mixer for mixing the pixel value calculated by the first interpolator with the pixel value calculated by the second interpolator when the similarity indicated by the maximum similarity index is less than a predetermined value.

12. A frame interpolation apparatus for generating a pixel value at an interpolation position in a frame interpolated between a first reference frame and a second reference frame, comprising:
a block pair extractor for extracting a plurality of pixel block pairs, each pixel block pair including a first pixel block occupying a first position in the first reference frame and a second pixel block occupying a second position in the second reference frame, the first and second positions being substantially point-symmetric with respect to the interpolation position, the second position differing from a position exactly point-symmetric to the first position by at most one pixel position horizontally and vertically;
a similarity index generator for calculating, for each pixel block pair extracted by the block pair extractor, a similarity index indicating a degree of mutual similarity between the first and second pixel blocks in the pixel block pair, based on values of pixels in the first and second pixel blocks;
a reference pixel selector for selecting a first reference pixel from a central position in the first pixel block in a pixel block pair of maximum similarity, as indicated by the calculated similarity indexes, and selecting a second reference pixel from a central position in the second pixel block in the pixel block pair of maximum similarity;
a first interpolator for calculating the pixel value at the interpolation position from values of the first and second reference pixels;
a block pair selector for selecting the pixel block pair of maximum similarity as a candidate block pair, selecting an evaluation block pair from among the pixel block pairs extracted by the block pair extractor, the evaluation block pair having a maximum similarity, as indicated by the calculated similarity indexes, among pixel block pairs outside a positional neighborhood of the candidate block pair;

a reliability evaluator for evaluating a condition including the similarity indexes of the candidate block pair and the evaluation block pair to decide whether the candidate block pair is reliable; and a delay circuit for temporarily storing information indicating positions of the first and second reference pixels; wherein when the reliability evaluator decides that the candidate block pair is unreliable, the reference pixel selector selects the first and second reference pixels according to the information stored in the delay circuit instead of selecting central pixels in the first and second pixel blocks.

13. The frame interpolation apparatus of claim 12, wherein the information stored by the delay circuit specifies the position of the second reference pixel in relation to the position of the first reference pixel.

14. The frame interpolation apparatus of claim 13, wherein, if a central position of the second pixel block in relation to a central position of the first pixel block in each pixel block pair extracted by the block pair extractor is plotted in a matrix, the positional neighborhood comprises the pixel block pairs surrounding the candidate block pair in the matrix.

15. The frame interpolation apparatus of claim 14, wherein the positional neighborhood consists of the pixel block pairs horizontally, vertically, and diagonally adjacent to the candidate block pair in the matrix.

16. The frame interpolation apparatus of claim 12, wherein the delay circuit supplies the temporarily stored information to the reference pixel selector with a delay of one frame.

17. The frame interpolation apparatus of claim 12, wherein the reliability evaluator calculates an average similarity index by averaging all of the similarity indexes calculated by the block pair extractor and uses the average similarity index in evaluating the reliability of the candidate block pair.

18. The frame interpolation apparatus of claim 17, wherein the reliability evaluator evaluates the reliability of the candidate block pair by evaluating the condition $$(Se-Sc) \times B > (Sa-Se)$$

where Sa is the average similarity index calculated by the reliability evaluator, Sc is the similarity index of the candidate block pair, Se is the similarity index of the evaluation block pair, and B is a constant greater than unity.

19. A method of generating, using a frame interpolation apparatus, a pixel value at an interpolation position in a frame interpolated between a first reference frame and a second reference frame, the method comprising:

extracting a plurality of pixel block pairs, each pixel block pair including a first pixel block occupying a first position in the first reference frame and a second pixel block occupying a second position in the second reference frame, the first and second positions being substantially point-symmetric with respect to the interpolation position, wherein the extracted pixel block pairs include at least one pixel block pair where the first and the second positions are exactly point-symmetric with respect to the interpolation position, and at least one pixel block pair where the second position differs from a position exactly point-symmetric to the first position, the difference being at most one pixel position horizontally and vertically;

calculating, for each extracted pixel block pair, a similarity index indicating a degree of mutual similarity between the first and second pixel blocks in the pixel block pair, based on values of pixels in the first and second pixel blocks;

selecting a first reference pixel from a central position in the first pixel block in a pixel block pair of maximum similarity among the extracted pixel block pairs, as indicated by the calculated similarity indexes, and selecting a second reference pixel from a central position in the second pixel block in the pixel block pair of maximum similarity; and calculating the pixel value at the interpolation position from values of the first and second reference pixels.

20. The method of claim 19, further comprising:

selecting the extracted pixel block pair of maximum similarity as a candidate block pair;

selecting an evaluation block pair from among the extracted pixel block pairs outside a positional neighborhood of the candidate block pair, the evaluation block pair having a maximum similarity, as indicated by the calculated similarity indexes, among the extracted pixel block pairs outside the positional neighborhood of the candidate block pair;

evaluating a condition including the similarity indexes of the candidate block pair and the evaluation block pair to decide whether the candidate block pair is reliable;

temporarily storing information indicating positions of the first and second reference pixels; and selecting the first and second reference pixels according to the temporarily stored information, instead of selecting the central pixels in the first and second pixel blocks, when the candidate block pair is unreliable.

* * * * *